US012693777B2

(12) United States Patent  
Hu et al.

(10) Patent No.: US 12,693,777 B2  
(45) Date of Patent: Jul. 28, 2026

(54) ANNOTATION METHOD AND ELECTRONIC DEVICE

(71) Applicant: Huawei Technologies Co., Ltd., Shenzhen (CN)

(72) Inventors: Yue Hu, Wuhan (CN); Zhiyan Yang, Shenzhen (CN); Xiuping Jiang, Wuhan (CN); Kai Peng, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 18/689,177

(22) PCT Filed: Aug. 26, 2022

(86) PCT No.: PCT/CN2022/115223  
§ 371 (c)(1),  
(2) Date: Mar. 5, 2024

(87) PCT Pub. No.: WO2023/030198  
PCT Pub. Date: Mar. 9, 2023

(65) Prior Publication Data  
US 2024/0370156 A1 Nov. 7, 2024

(30) Foreign Application Priority Data

Sep. 6, 2021 (CN) .......................... 202111039715.4

(51) Int. Cl.  
*G06F 3/0485* (2022.01)  
*G06F 40/169* (2020.01)

(52) U.S. Cl.  
CPC .......... *G06F 3/0485* (2013.01); *G06F 40/169* (2020.01); *G06F 2203/04803* (2013.01)

(58) Field of Classification Search  
CPC ................. G06F 3/0485; G06F 40/169; G06F 2203/04803; G06F 3/0481; G06F 3/04842;

(Continued)

(56) References Cited

U.S. PATENT DOCUMENTS 8,375,283 B2 * 2/2013 Fei ........................ G06F 40/169  
715/205  
11,079,995 B1 * 8/2021 Hulbert ................. G06F 3/1423

(Continued)

FOREIGN PATENT DOCUMENTS

CN 104978110 A * 10/2015 ........... G06F 3/0488  
CN 105786713 A * 7/2016 .......... G06F 11/3604

(Continued)

OTHER PUBLICATIONS

CN110196675A, English translation, published Sep. 3, 2019, pp. 1-23 (Year: 2019).*

(Continued)

*Primary Examiner* — Stephen S Hong  
(74) *Attorney, Agent, or Firm* — Slater Matsil, LLP

(57) ABSTRACT

A method includes: displaying a first interface including a first application interface and a second application interface that are displayed in a split-screen manner; receiving a first annotation operation performed by a user on the first interface; displaying a first annotation on the first interface in response to the first annotation operation; receiving a first scrolling operation performed by the user on the first interface; displaying a second interface including the first application interface and the second application interface that are displayed in the split-screen manner; receiving a second annotation operation performed by the user on the second interface; displaying a second annotation on the second interface in response to the second annotation operation; and (Continued)

generating a first annotation picture, where the first annotation picture includes the first annotation, the second annotation, the first interface, and the second interface.

20 Claims, 21 Drawing Sheets

(58) Field of Classification Search
CPC .. G06F 3/04883; G06F 3/04886; G06F 9/451; G06F 40/171
See application file for complete search history.

(56) References Cited

U.S. PATENT DOCUMENTS

| | | | | |
|---|---|---|---|---|
| 11,797,145 | B2 * | 10/2023 | Zhao ..................... G06F 3/0482 |
| 12,135,976 | B2 * | 11/2024 | Zhang ..................... G06F 9/451 |
| 2007/0239831 | A1 | 10/2007 | Basu |
| 2014/0032616 | A1 * | 1/2014 | Nack ....................... G06F 9/451 |
| | | | | 715/230 |
| 2016/0092064 | A1 * | 3/2016 | Wu ..................... G06F 3/04817 |
| | | | | 715/789 |
| 2016/0110317 | A1 | 4/2016 | Tashman |
| 2017/0371535 | A1 * | 12/2017 | Li ........................ G06F 3/04817 |
| 2018/0039381 | A1 * | 2/2018 | Hynes ................... G06F 3/0481 |
| 2018/0088794 | A1 * | 3/2018 | Graham ............. G06F 3/04883 |
| 2023/0328173 | A1 * | 10/2023 | Wang ..................... G11B 27/34 |
| | | | | 715/863 |
| 2023/0367532 | A1 * | 11/2023 | Peng ................... G06F 3/04886 |
| 2024/0370156 | A1 * | 11/2024 | Hu ........................ G06F 3/0481 |

FOREIGN PATENT DOCUMENTS

| | | | | |
|---|---|---|---|---|
| CN | 107797971 A | | 3/2018 | |
| CN | 108459836 A | | 8/2018 | |
| CN | 110196675 A | * | 9/2019 | ......... G06F 3/04883 |
| CN | 112580312 A | * | 3/2021 | ......... G06F 3/04883 |
| WO | WO-2020211709 A1 | * | 10/2020 | ......... G06F 3/04883 |

OTHER PUBLICATIONS

CN105786713A, English translation, published Jul. 20, 2016, pp. 1-18 (Year: 2016).*
CN104978110A, English translation, published Oct. 14, 2015, pp. 1-11 (Year: 2015).*

* cited by examiner

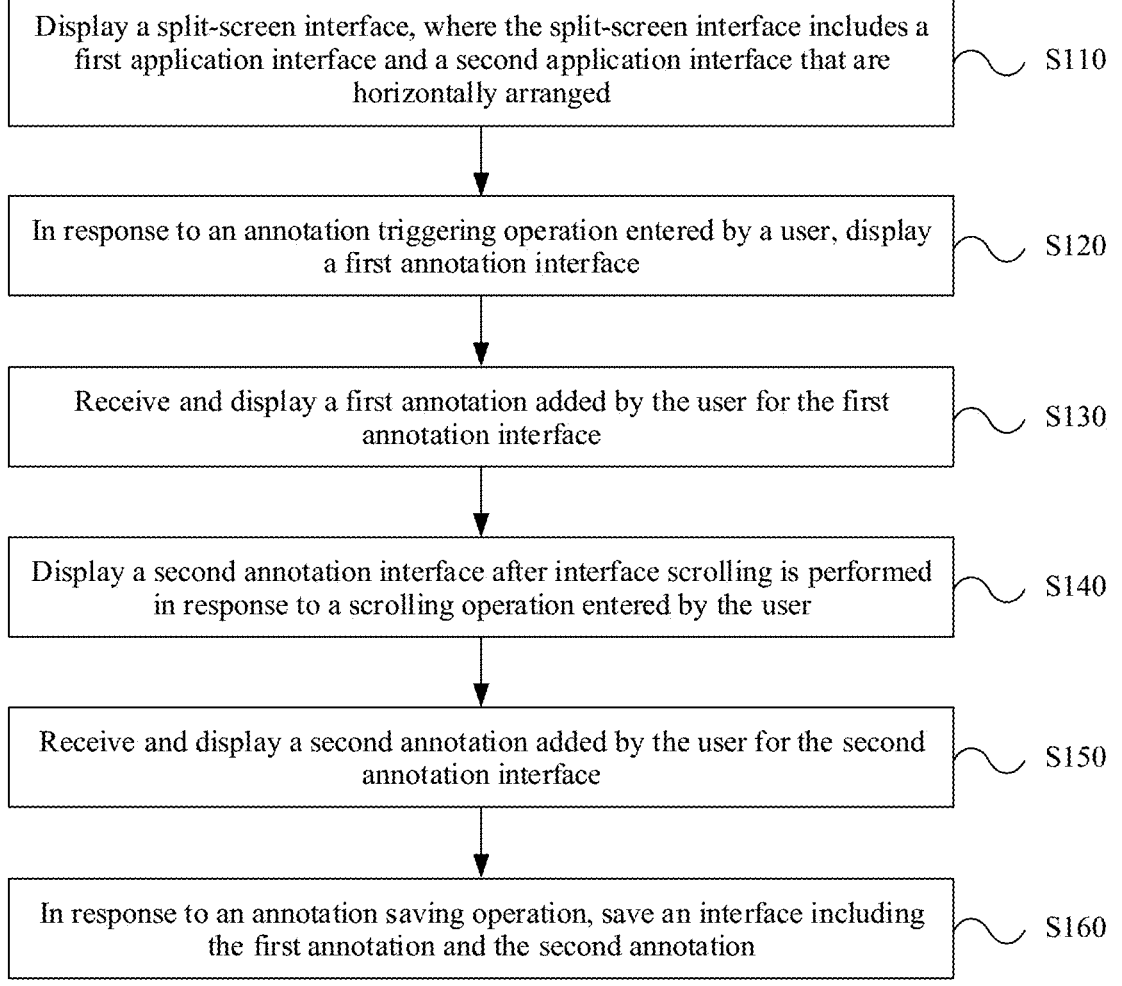

Display a split-screen interface, where the split-screen interface includes a first application interface and a second application interface that are horizontally arranged ⟶ S110

In response to an annotation triggering operation entered by a user, display a first annotation interface ⟶ S120

Receive and display a first annotation added by the user for the first annotation interface ⟶ S130

Display a second annotation interface after interface scrolling is performed in response to a scrolling operation entered by the user ⟶ S140

Receive and display a second annotation added by the user for the second annotation interface ⟶ S150

In response to an annotation saving operation, save an interface including the first annotation and the second annotation ⟶ S160

ANNOTATION METHOD AND ELECTRONIC DEVICE

CROSS-REFERENCE TO RELATED APPLICATIONS

This application is a national stage of International Application No. PCT/CN2022/115223, filed on Aug. 26, 2022, which claims priority to Chinese Patent Application 202111039715.4, filed on Sep. 6, 2021. Both of the aforementioned applications are hereby incorporated by reference in their entireties.

TECHNICAL FIELD

This application relates to the field of terminal technologies, and in particular, to an annotation method and an electronic device.

BACKGROUND

Electronic devices such as mobile phones and tablet computers have been increasingly applied to work and study of people. For ease of use by users, some electronic devices provide an annotation function, and a user may annotate content such as text or pictures by using the annotation function.

For example, as shown in (a) in FIG. 1, a user may open the "Gallery" application (application, APP) on a tablet computer, and control the tablet computer to enter an annotation mode. After entering the annotation mode, as shown in (b) in FIG. 1, the user may perform annotation on a picture by using a stylus on an annotation interface. In addition, the annotation interface may provide a toolbar, and the user may adjust annotation content and the like by using the toolbar.

However, current application scenarios of the annotation function are limited, and use by the user is insufficiently free and flexible.

SUMMARY

In view of this, this application provides an annotation method and an electronic device, used to enrich application scenarios of an annotation function, thereby improving flexibility of annotation performed by a user.

To achieve the foregoing objective, according to a first aspect, an embodiment of this application provides an annotation method, including:

displaying a first interface, where the first interface includes a first application interface and a second application interface that are displayed in a split-screen manner;

receiving a first annotation operation performed by a user on the first interface;

displaying a first annotation on the first interface in response to the first annotation operation;

receiving a first scrolling operation performed by the user on the first interface;

displaying a second interface in response to the first scrolling operation, where the second interface includes the first application interface and the second application interface that are displayed in a split-screen manner, and the second interface is different from the first interface;

receiving a second annotation operation performed by the user on the second interface;

displaying a second annotation on the second interface in response to the second annotation operation; and generating a first annotation picture, where the first annotation picture includes: the first annotation, the second annotation, the first interface, and the second interface.

When displaying the first application interface and the second application interface in a split-screen manner, the electronic device may receive an annotation triggering operation of the user, enter an annotation mode, and display an annotation interface (that is, the first interface); the first application interface and the second application interface may continue to be displayed in a split-screen manner in the first interface, and an annotation layer may be loaded on a displayed application interface, where the annotation layer may be transparent, and the annotation layer may also include a toolbar.

The first annotation operation and the second annotation operation may be an annotation operation performed by the user on a screen by using a stylus, a finger, or the like.

For example, when the third application interface and the fourth application interface are displayed in a left-right split-screen manner, the user enters an upward or downward scrolling operation, and the electronic device may scroll the first application interface and/or the second application interface, to implement annotation in an up-down scrolling manner in a left-right split-screen scenario.

For another example, when the third application interface and the fourth application interface are displayed in an up-down split-screen manner, the user enters a leftward or rightward scrolling operation, and the electronic device may scroll the first application interface and/or the second application interface, to implement annotation in a left-right scrolling manner in an up-down split-screen scenario.

In the annotation method provided in this embodiment of this application, the electronic device may enter the annotation mode in a split-screen scenario for the user to perform annotation. In the annotation mode, the user may perform annotation on the first application interface and the second application interface that are displayed in a split-screen manner, and the user may perform annotation in a scrolling manner. Therefore, the method can enrich application scenarios of an annotation function, improve flexibility of annotation performed by the user, and improve annotation experience of the user.

In a possible implementation of the first aspect, the displaying a second interface in response to the first scrolling operation specifically includes:

in response to the first scrolling operation, switching the first application interface displayed in a split-screen manner from a first sub-interface of a first application to a second sub-interface of the first application.

In the foregoing implementation, the electronic device may update displayed interface content of the first application interface in response to the scrolling operation of the user, so that the user can scroll the interface content of the first application interface in the annotation mode, thereby improving flexibility of performing annotation by the user.

In a possible implementation of the first aspect, the method further includes:

in response to the first scrolling operation, switching the second application interface displayed in a split-screen manner from a third sub-interface of a second application to a fourth sub-interface of the second application.

In the foregoing implementation, synchronous scrolling of interface content in the first application interface and the second application interface may be implemented, so that convenience of use by the user can be improved.

In a possible implementation of the first aspect, if the first scrolling operation is an upward scrolling operation, the first sub-interface in the first annotation picture is located above the second sub-interface, and the third sub-interface is located above the fourth sub-interface.

By using the foregoing implementation, in a process of performing annotation, the user may view interface content behind the first application interface and the second application interface by using an upward scrolling operation.

In a possible implementation of the first aspect, if the first scrolling operation is a downward scrolling operation, the first sub-interface in the first annotation picture is located below the second sub-interface, and the third sub-interface is located below the fourth sub-interface.

By using the foregoing implementation, in a process of performing annotation, the user may view interface content before the first application interface and the second application interface by using a downward scrolling operation.

In a possible implementation of the first aspect, if the first application interface is located on a left side of the second application interface, the first sub-interface in the first annotation picture is located on a left side of the third sub-interface, and the second sub-interface is located on a left side of the fourth sub-interface; or if the first application interface is located on a right side of the second application interface, the first sub-interface in the first annotation picture is located on a right side of the third sub-interface, and the second sub-interface is located on a right side of the fourth sub-interface.

In the foregoing implementation, the user may perform annotation in a scrolling manner in a left-right split-screen scenario.

In a possible implementation of the first aspect, the fourth sub-interface is a filling page. In this way, for an application interface that cannot continue to be scrolled, the user may use more annotation space by using the filling page.

In a possible implementation of the first aspect, the first application interface further includes a first component fixedly displayed at a bottom of the first application interface, and the method further includes:

after the first scrolling operation performed by the user on the first interface is received, skipping displaying the first component.

In the foregoing implementation, a component such as a menu bar that is fixedly displayed at the bottom of the first application interface is not displayed in a scrolling annotation process. In this way, the user may view more interface content on the screen, to improve annotation experience of the user.

In a possible implementation of the first aspect, the first application interface further includes a second component fixedly displayed at a top of the first application interface, and the method further includes:

after the first scrolling operation performed by the user on the first interface is received, skipping displaying the second component.

In the foregoing implementation, a component such as a status bar that is fixedly displayed at the top of the first application interface is not displayed in a scrolling annotation process. In this way, the user may view more interface content on the screen, to improve annotation experience of the user.

In a possible implementation of the first aspect, the method further includes:

displaying a third interface, where the third interface includes a third application interface and a fourth application interface that are displayed in a split-screen manner;

receiving a second scrolling operation performed by the user on the third application interface displayed in the third interface;

in response to the second scrolling operation, displaying the third application interface in full screen;

receiving a third annotation operation performed by the user on the third application interface;

in response to the third annotation operation, displaying a third annotation on the third application interface; and generating a second annotation picture, where the second annotation picture includes: the third annotation and the third application interface.

For example, when the third application interface and the fourth application interface are displayed in an up-down split-screen manner, the user enters an upward or downward scrolling operation, and the electronic device may display an application interface in full screen when the user scrolls the application interface, to implement annotation in an up-down scrolling manner in an up-down split-screen scenario.

For another example, when the third application interface and the fourth application interface are displayed in a left-right split-screen manner, the user enters a leftward or rightward scrolling operation, and the electronic device may display an application interface in full screen when the user scrolls the application interface, to implement annotation in a left-right scrolling manner in a left-right split-screen scenario.

By using the foregoing implementation, application scenarios of the annotation function may be further enriched, flexibility of annotation performed by the user is improved, and annotation experience of the user is improved.

In a possible implementation of the first aspect, the method further includes:

displaying a fourth interface, where the fourth interface includes a fifth application interface and a sixth application interface that are displayed in a split-screen manner;

receiving a fourth annotation operation performed by the user on the fifth application interface or the sixth application interface;

in response to the fourth annotation operation, displaying a fourth annotation on the fifth application interface or the sixth application interface;

receiving a third scrolling operation performed by the user on the fifth application interface;

in response to the third scrolling operation, displaying the fifth application interface in full screen; and generating a third annotation picture, where the third annotation picture includes: the fifth application interface displayed in full screen, the sixth application interface, and the fourth annotation.

After the fifth application interface is displayed in full screen, the user may add an annotation to the fifth application interface, scroll the interface, and the like. After the user enters an annotation saving operation, the electronic device may combine the fifth application interface displayed in the annotation process and the annotation added by the user on the fifth application interface into one annotation picture, combine the sixth application interface displayed in the annotation process and an annotation added by the user on the sixth application interface into one annotation picture, and then splice the two annotation pictures together for saving.

By using the foregoing implementation, application scenarios of the annotation function may be further enriched, flexibility of annotation performed by the user is improved, and annotation experience of the user is improved.

In a possible implementation of the first aspect, the method further includes:

displaying a fifth interface, where the fifth interface includes a seventh application interface and an eighth application interface that are displayed in a split-screen manner;

receiving a fifth annotation operation performed by the user on the fifth interface;

in response to the fifth annotation operation, displaying a fifth annotation, where the fifth annotation overlaps a boundary between the seventh application interface and the eighth application interface;

receiving a fourth scrolling operation performed by the user on the seventh application interface;

in response to the fourth scrolling operation, displaying a prompt interface for the user to select whether to save the annotation;

in response to a selection operation of the user, displaying the seventh application interface in full screen; and when the selection operation is an operation of selecting not to save the annotation, generating a fourth annotation picture; or when the selection operation is an operation of selecting to save the annotation, generating a fourth annotation picture and a fifth annotation picture, where the fourth annotation picture includes: the seventh application interface displayed in full screen and the fifth annotation, and the fifth annotation picture includes the fifth interface and the fifth annotation.

By using the foregoing implementation, application scenarios of the annotation function may be further enriched, flexibility of annotation performed by the user is improved, and annotation experience of the user is improved.

In a possible implementation of the first aspect, the method further includes:

displaying a sixth interface, where the sixth interface includes a ninth application interface displayed in full screen and a tenth application interface displayed in a floating manner on the ninth application interface; and in response to an annotation triggering operation, hiding the tenth application interface displayed in a floating manner, or displaying the ninth application interface and the tenth application interface in a split-screen manner.

In the foregoing implementation, the electronic device may enable the user to enter the annotation mode in a floating window scenario, so that application scenarios of an annotation function can be further enriched, flexibility of annotation performed by the user is improved, and annotation experience of the user is improved.

According to a second aspect, an embodiment of this application provides an electronic device, including a memory and a processor, where the memory is configured to store a computer program, and the processor is configured to perform the method according to the first aspect or any implementation of the first aspect when invoking the computer program.

According to a third aspect, an embodiment of this application provides a computer-readable storage medium, storing a computer program, where when the computer program is executed by a processor, the method according to the first aspect or any implementation of the first aspect is implemented.

According to a fourth aspect, an embodiment of this application provides a computer program product. When the computer program product is run on an electronic device, the electronic device is enabled to perform the method according to the first aspect or any implementation of the first aspect.

According to a fifth aspect, an embodiment of this application provides a chip system, including a processor, where the processor is coupled to a memory, and the processor executes a computer program stored in the memory, to implement the method according to the first aspect or any implementation of the first aspect. The chip system may be a single chip or a chip module including a plurality of chips.

It may be understood that, for beneficial effects of the second aspect to the fifth aspect, refer to related descriptions in the first aspect. Details are not described herein again.

BRIEF DESCRIPTION OF THE DRAWINGS

FIG. 2 is a schematic flowchart of an annotation method according to an embodiment of this application;

DETAILED DESCRIPTION OF THE EMBODIMENTS

To enrich application scenarios of an annotation function and improve flexibility of annotation performed by a user, an embodiment of this application provides a technical solution. In this solution, an electronic device may enter an annotation mode in a multi-window scenario for a user to perform annotation.

The electronic device may be a display device such as a mobile phone, a tablet computer, a notebook computer, or an e-reader. This is not particularly limited in this embodiment of this application. For ease of description, a tablet computer is used as an example for the following description in this embodiment of this application.

The multi-window scenario may include two or more windows. The plurality of windows included in the multi-window scenario may be arranged horizontally (for example, a left-right split-screen scenario), or may be arranged vertically (for example, an up-down split-screen scenario), or may be arranged in an overlapping manner (for example, a floating window scenario). The following describes the technical solutions of this application by using the left-right split-screen scenario, the up-down split-screen scenario, and the floating window scenario as examples.

First, the left-right split-screen scenario is described.

FIG. 2 is a schematic flowchart of an annotation method according to an embodiment of this application. As shown in FIG. 2, the annotation method provided in this embodiment may include the following steps.

S110: Display a split-screen interface, where the split-screen interface includes a first application interface and a second application interface that are horizontally arranged.

Figure 1:
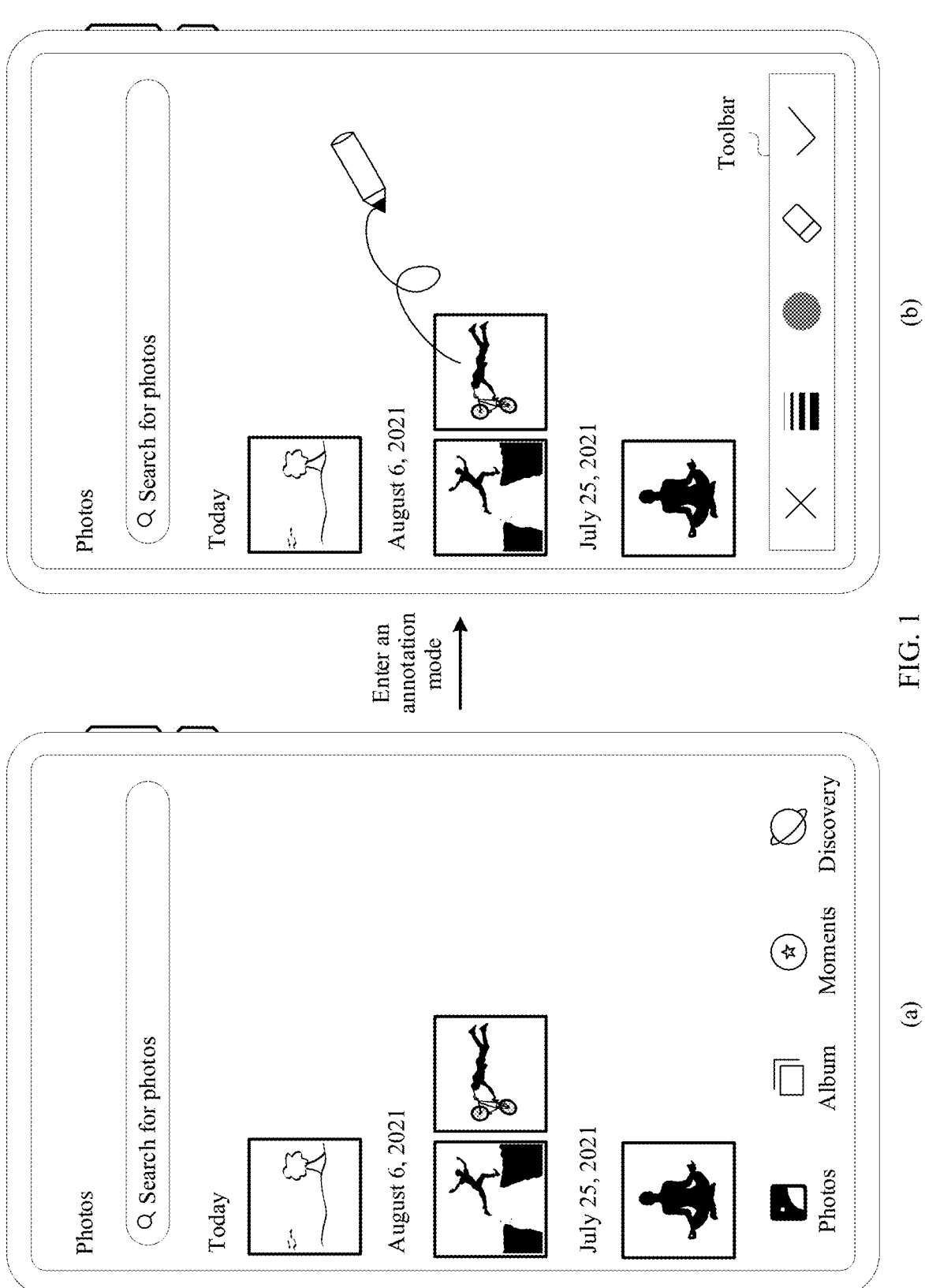
FIG. 1 is a schematic diagram of an existing annotation scenario.
Figure 3:
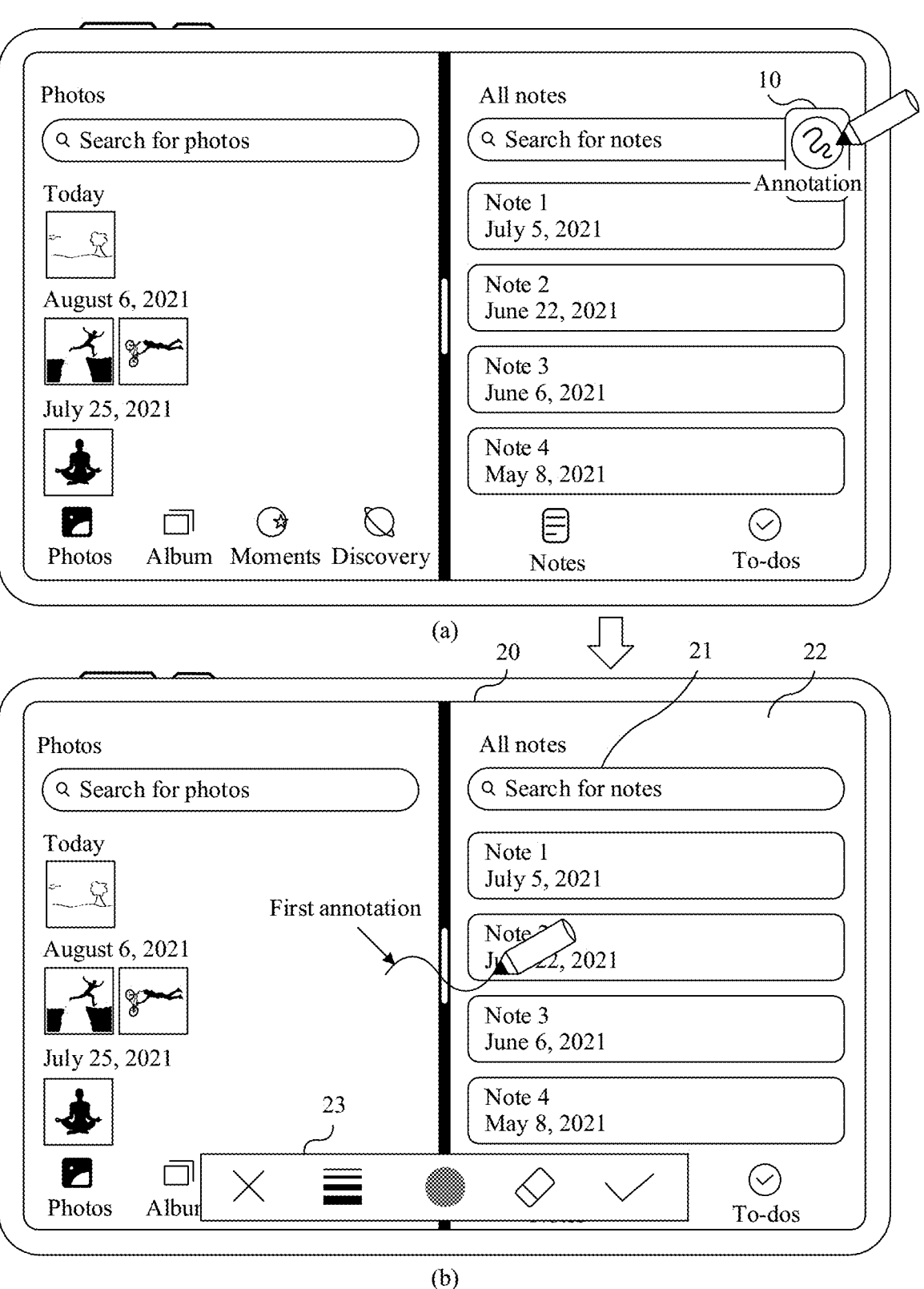
FIG. 3 is a schematic diagram of an annotation scenario according to an embodiment of this application.

For example, as shown in (a) in FIG. 3, in the split-screen interface displayed on the electronic device, the first application interface is an application interface of the "Gallery" APP, the second application interface is an application interface of the "Notepad" APP, the "Gallery" APP and the "Notepad" APP are displayed in a left-right split-screen manner, and the first application interface is located on a left side of the second application interface. The position relationship is also used as an example for description subsequently.

It may be understood that, application interfaces of a same APP may also be displayed in the left and right split screens, that is, APPs corresponding to the first application interface and the second application interface may be the same. A user may control the first application interface and the second application interface to display same or different content. This display mode may also be referred to as an App multiplier. In addition, the left and right split screens may also be bar division on application interfaces of a same APP. In this embodiment, an example in which the first application interface and the second application interface are application interfaces of different APPs is used for description.

S120: In response to an annotation triggering operation entered by the user, display a first annotation interface.

As shown in (a) and (b) in FIG. 3, when the split-screen interface is displayed on the electronic device, the user may enter the annotation triggering operation, to trigger the electronic device to enter an annotation mode and display an annotation interface (referred to as the first annotation interface herein).

In an optional implementation, the annotation triggering operation may be an operation performed by the user on a screen of the electronic device.

Specifically, the annotation triggering operation may be a triggering operation on a target control in a floating menu.

As shown in (a) in FIG. 3, after establishing a connection to a stylus, the electronic device may display a floating menu 10 on the screen. The floating menu 10 may provide an annotation control (that is, the target control), and the user may trigger, by tapping the control, the electronic device to enter the annotation mode.

Figure 4:
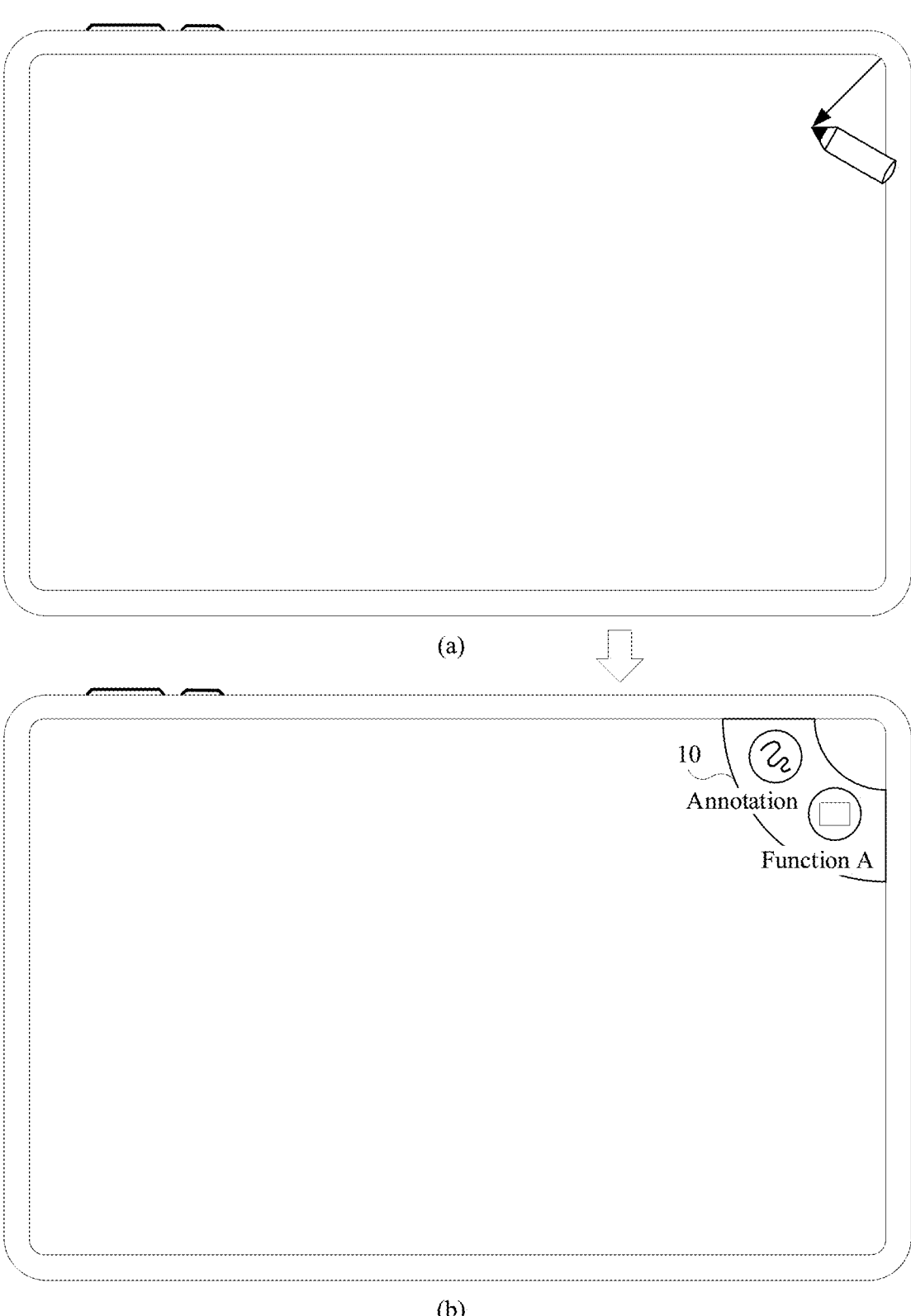
FIG. 4 is a schematic diagram of a floating menu triggering process according to an embodiment of this application.

FIG. 4 shows another implementation of the floating menu. As shown in (a) in FIG. 4, the user may slide inwards from a first corner (an upper right corner is used as an example herein) of the screen to open the floating menu 10. As shown in (b) in FIG. 4, the floating menu 10 may be in a semi-ring shape, and is displayed along an upper edge and a right edge of the screen. Similar to FIG. 3, the floating menu 10 may provide the annotation control, and the user may trigger, by tapping the control, the electronic device to enter the annotation mode. To be specific, the annotation triggering operation may include an operation of triggering the electronic device to display the floating menu and an operation of tapping the annotation control.

The operation of triggering the electronic device to display the floating menu is not limited to the foregoing operation of sliding inwards from the upper right corner of the screen, and may alternatively be another operation. For example, the user may alternatively slide outwards on the screen to a screen edge area close to an upper right corner, to trigger the electronic device to display the floating menu.

When the floating menu needs to be closed, the user may trigger, by tapping an area outside the floating menu or performing another operation, the electronic device to close the floating menu.

As shown in (b) in FIG. 4, the floating menu may further provide another function control. Herein, for example, a control corresponding to a function A is included. When the floating menu includes a relatively large quantity of function controls, some function controls may be displayed in the floating menu, for example, two function controls are displayed, and other function controls may be hidden. The user may slide upwards or downwards in an arched manner along an extension direction of the floating menu, to control function controls displayed in the floating menu.

The annotation triggering operation performed by the user on the screen of the electronic device may alternatively be a preset gesture operation. For example, the user may slide inwards from a second corner (for example, a lower left corner) of the screen to trigger the electronic device to enter the annotation mode; or the user may perform a target gesture operation across space to trigger the electronic device to enter the annotation mode. The gesture operation is not particularly limited in this embodiment.

In this embodiment, a touch operation performed on the screen of the electronic device may be a touch operation performed by the user by using a finger, or may be a touch operation performed by the user by using a stylus. In this embodiment, the stylus is used as an example for description.

In another optional implementation, the annotation triggering operation may alternatively be an operation performed by the user on the stylus.

For example, the user may double-tap a barrel of the stylus, shake the barrel, or press a target key on the stylus, to trigger the electronic device to enter the annotation mode.

As shown in (b) in FIG. 3, after the electronic device enters the annotation mode, the displayed first annotation interface may include interface content 21 of the split-screen interface and an annotation layer covering the interface content 21. The annotation layer may include a transparent area 22 and a toolbar 23.

The user may view the interface content 21 below the annotation layer through the transparent area 22, and perform annotation on the interface content 21 in the transparent area 22.

Function options for adjusting annotation content are disposed in the toolbar 23. (b) in FIG. 3 shows several function options as examples, which are sequentially from left to right: an option for exiting the annotation mode, an option for adjusting a line thickness, an option for adjusting a line color, an eraser option, and an option for saving an annotation.

It may be understood that the function options in the toolbar 23 are not limited to the options shown in FIG. 3, and may include more or fewer options. This is not particularly limited in this embodiment.

The toolbar 23 may be located at the bottom of the first annotation interface by default, and the user may also drag the toolbar 23 to change a position of the toolbar 23.

S130: Receive and display a first annotation added by the user for the first annotation interface.

As shown in (b) in FIG. 3, after the electronic device enters the annotation mode, the user may add, in the transparent area 22 by using the stylus, an annotation (that is, the first annotation) to the interface content 21, and the electronic device may display, in real time, the annotation added by the user.

In a process of adding the annotation, the user may select a function option in the toolbar 23 to adjust a line thickness or color, or erase an annotation line.

S140: Display a second annotation interface after interface scrolling is performed in response to a scrolling operation entered by the user.

S150: Receive and display a second annotation added by the user for the second annotation interface.

S160: In response to an annotation saving operation, save an interface including the first annotation and the second annotation.

In a process of performing annotation, if the user wants to continue to browse subsequent interface content in the first application interface and the second application interface, the user may enter a screen scrolling operation (that is, the scrolling operation) on the screen. In this embodiment, after receiving the scrolling operation entered by the user, the electronic device may scroll the interface to update interface content displayed in the annotation interface. Then, the user may continue to add an annotation (that is, the second annotation) on an annotation interface obtained after scrolling (that is, the second annotation interface). After the annotation is completed, the annotation may be saved by using the annotation saving option in the toolbar 23, or the electronic device may automatically save, each time the user completes an annotation operation, the application interface displayed in the annotation process and the annotation added by the user. In this embodiment, an example in which user saves the annotation by using the toolbar 23 is used for description.

Specifically, the scrolling operation may be an upward sliding operation or a downward sliding operation performed by the user on the screen, or may be a leftward sliding operation or a rightward sliding operation performed by the user on the screen. Scrolling annotation processes corresponding to various scrolling operations are similar, and a main difference lies in different scrolling directions. The following uses the upward sliding operation as an example for description.

In an optional implementation, after receiving the scrolling operation of the user, the electronic device may synchronously display the first application interface and the second application interface in a scrolling manner. The following describes several possible scrolling annotation scenarios by using examples.

Scenario 01: With reference to (a) in FIG. 5, interface content of the first application interface is scrollable, for example, an email APP or a weather APP. Interface content included in application interfaces of these APPs is usually more than what is displayed on the screen. When the interface content does not reach the bottom, when the APP responds to the scrolling operation of the user, the interface content may scroll up and down on the application interface. Interface content of the second application interface is non-scrollable, for example, a calculator APP or a compass APP. Interface content included in application interfaces of these APPs may be usually displayed on the screen completely, that is, the interface content has reached the bottom. When the APP responds to the scrolling operation of the user, the interface content does not scroll on the application interface.

Figure 5:
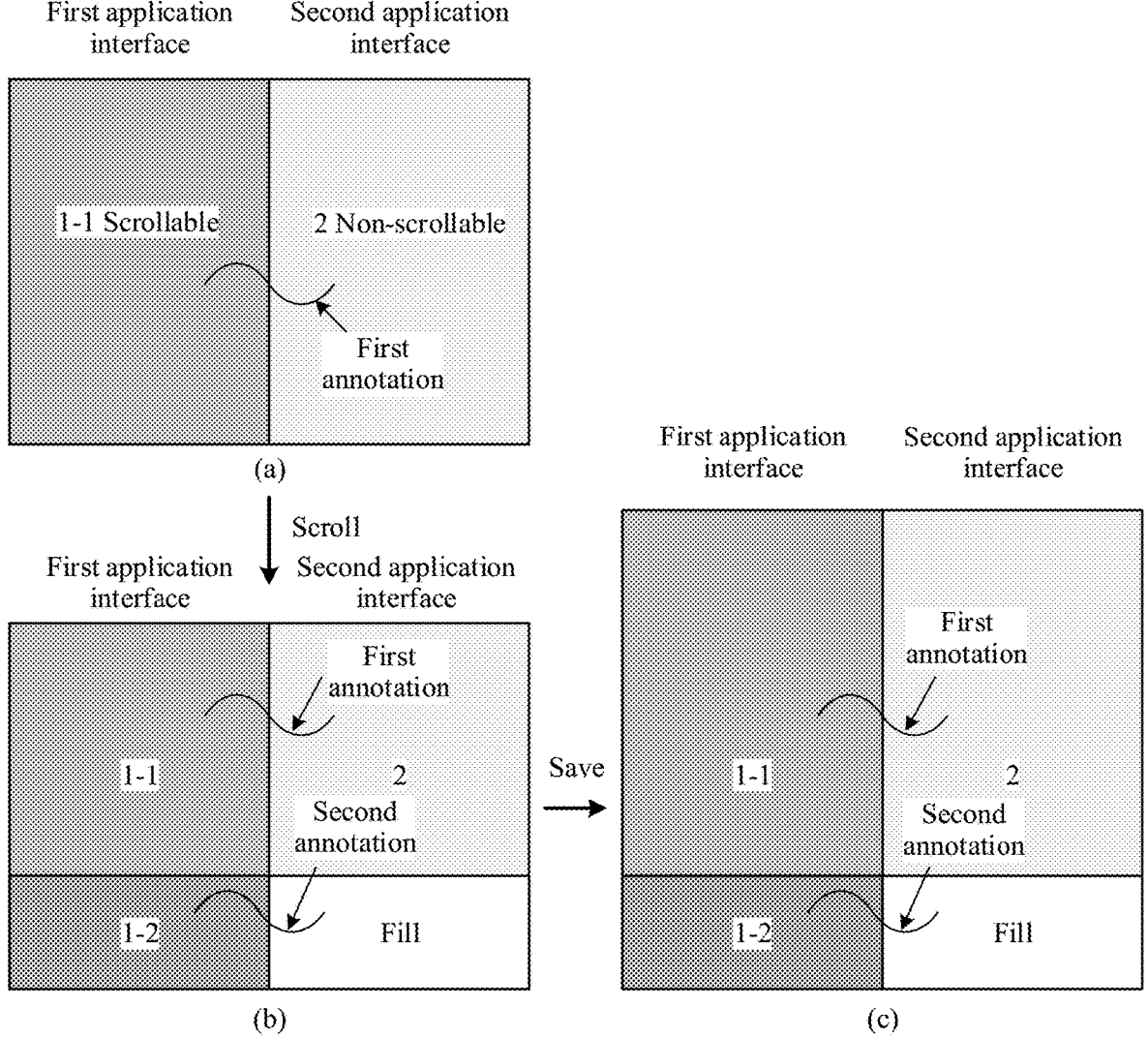
FIG. 5 to FIG. 17 are schematic diagrams of some annotation scenarios according to an embodiment of this application.

As shown in (a) in FIG. 5, interface content displayed in the first annotation interface before scrolling includes interface content 1-1 of the first application interface and interface content 2 of the second application interface; and annotation content includes the first annotation. The first annotation is located in a middle area of the screen, and the first annotation horizontally crosses the interface content 1-1 and the interface content 2. A position of the first annotation in the first annotation interface in subsequent scenarios 02 to 06 is also described by using this position as an example.

After the user enters the scrolling operation, the electronic device may scroll up the interface content of the first application interface and the interface content of the second application interface, and synchronously scroll the annotation layer. The interface content of the first application interface is scrollable, and new interface content may be displayed in a scrolling process. The interface content of the second application interface is non-scrollable, that is, the interface content has reached the bottom. In this case, the bottom of the interface content of the second application interface may be filled with preset content. For example, the filled content may be a white page, a background page of the second application interface, or the like. In this embodiment, the white page is used as an example for description.

As shown in (b) in FIG. 5, the electronic device scrolls up the interface content of the first application interface, the interface content of the second application interface, and the annotation layer. In the second annotation interface displayed after scrolling, the interface content in the first application interface may include, from top to bottom, a part of the interface content 1-1 that is of the first application interface and that is displayed in the first annotation interface and newly displayed interface content 1-2 of the first application interface. The interface content of the second application interface may include, from top to bottom, a part of the interface content 2 that is of the second application interface and that is displayed in the first annotation interface and the filled content of the second application interface. The first annotation is synchronously scrolled up, and is moved from the middle area of the screen to an upper area of the screen.

After scrolling, the user may continue to add the second annotation to the second annotation interface. As shown in (b) in FIG. 5, the second annotation is located on newly displayed interface content in the second annotation interface, and the second annotation horizontally crosses an area in which the interface content 1-2 of the first application interface is located and an area in which the filled content of the second application interface is located. It may be understood that, in the second annotation interface after scrolling, the user may also add annotations to the interface content 1-1 of the first application interface and the interface content 2 of the second application interface.

After performing annotation, the user may enter the annotation saving operation to save the annotation interface. After receiving the annotation saving operation of the user, the electronic device may combine the interface content of the first application interface, the interface content of the second application interface, and the annotation in the annotation layer that are displayed in the entire annotation process, and then save an obtained annotation picture.

As shown in (c) in FIG. 5, in the saved annotation picture, the interface content of the first application interface may include, from top to bottom, the entire interface content 1-1 that is of the first application interface and that is displayed in the first annotation interface and the interface content 1-2 that is of the first application interface and that is newly displayed in the second annotation interface; and the interface content of the second application interface may include, from top to bottom, the entire interface content 2 that is of the second application interface and that is displayed in the first annotation interface and the filled content displayed in the second annotation interface. The annotation content may include, from top to bottom, the first annotation and the second annotation added by the user.

When saving the annotation picture, the electronic device may save the annotation picture in a default path, for example, may save the annotation picture in Album or Notepad. The user may also set a saving path. For example, after the user selects the annotation saving option in the toolbar 23, the electronic device may display a pop-up window for the user to set the saving path, and then the annotation picture is saved in the path set by the user.

In addition, after generating the annotation picture, the electronic device may further display a preview interface. For example, the annotation picture may be displayed in the preview interface by using a pop-up window in a manner similar to a screenshot. If an operation of tapping the annotation picture by the user is not received within a preset time, the annotation picture may be saved in a default path. If the operation of tapping the annotation picture by the user is received within the preset time, a picture editing interface may be displayed. The picture editing interface may include the annotation picture and some edit controls, for example, a delete control, a save control, a mosaic control, and a share control. The user may delete the annotation picture in the picture editing interface, or save and/or share the picture after performing related editing.

It may be understood that content newly displayed by scrolling the interface is related to a sliding distance in the scrolling operation. Therefore, the interface content that is in the second annotation interface and that is displayed after scrolling may be completely or partially different from the interface content that is in the first annotation interface and that is displayed before scrolling. In this embodiment, a partial difference is used as an example for description. In addition, for ease of understanding, the toolbar 23 is omitted in (a) and (b) in FIG. 5, and the subsequent accompanying drawings are similar.

Scenario 02: With reference to (a) in FIG. 6, interface content of the first application interface and interface content of the second application interface are both scrollable, and interface content displayed in the first annotation interface before scrolling includes interface content 1-1 of the first application interface and interface content 2-1 of the second application interface.

After the user enters the scrolling operation, the electronic device may scroll up the interface content of the first application interface, the interface content of the second application interface, and the annotation layer. The interface content of the first application interface and the interface content of the second application interface are both scrollable, and new interface content may be displayed in a scrolling process.

Figure 6:
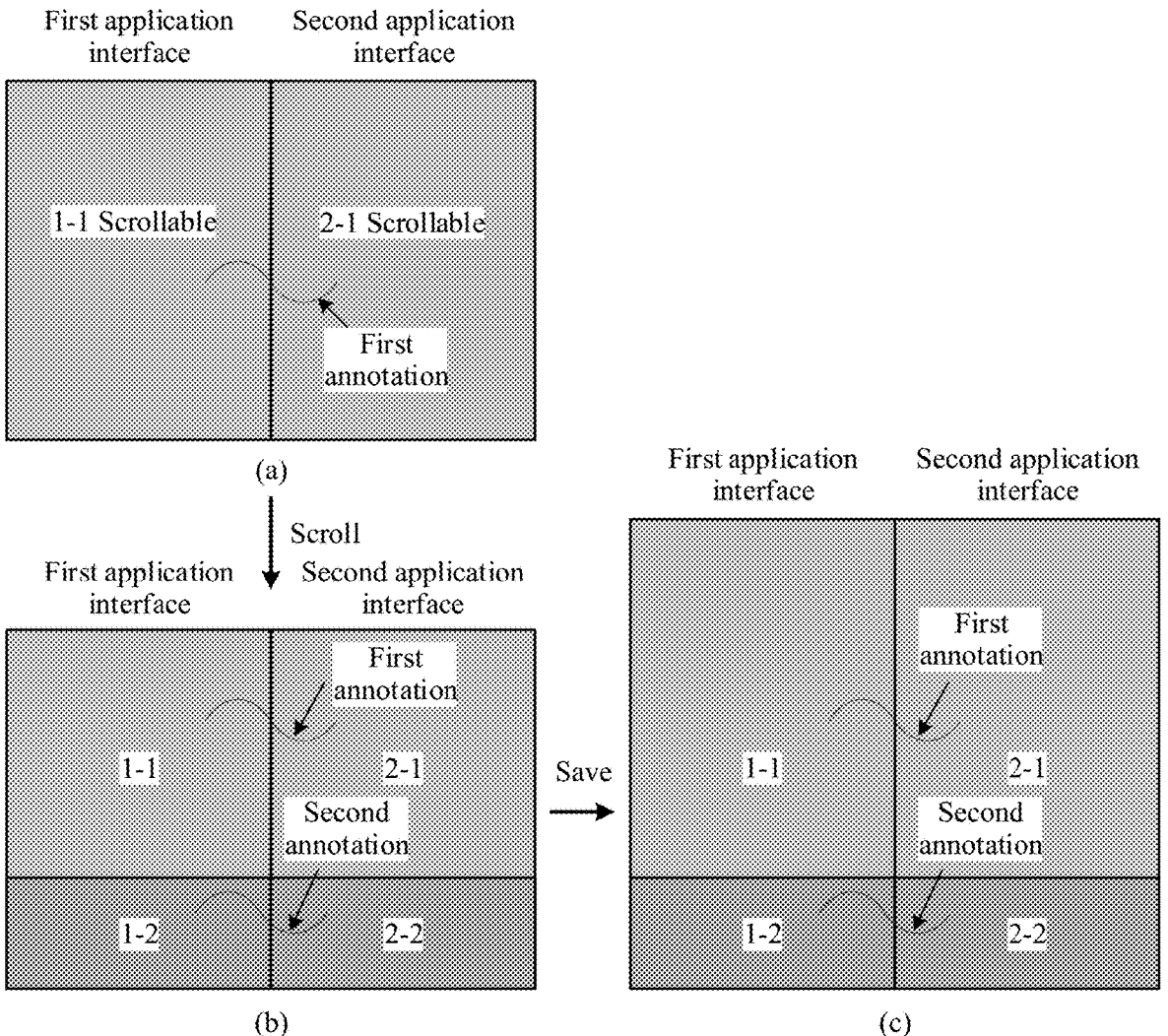

As shown in (b) in FIG. 6, in the second annotation interface displayed after scrolling, the interface content in the first application interface may include, from top to bottom, a part of the interface content 1-1 that is of the first application interface and that is displayed in the first annotation interface and newly displayed interface content 1-2 of the first application interface. The interface content of the second application interface may include, from top to bottom, a part of the interface content 2-1 that is of the second application interface and that is displayed in the first annotation interface and newly displayed interface content 2-2 of the second application interface. The first annotation is synchronously scrolled up, and is moved from the middle area of the screen to an upper area of the screen.

As shown in (b) in FIG. 6, the user may save the annotation interface after adding the second annotation to the second annotation interface, where the second annotation horizontally crosses the interface content 1-2 of the first application interface and the interface content 2-2 of the second application interface. As shown in (c) in FIG. 6, after the electronic device receives the annotation saving operation of the user, in the saved annotation picture, the interface content of the first application interface may include, from top to bottom, the entire interface content 1-1 that is of the first application interface and that is displayed in the first annotation interface and the interface content 1-2 that is of the first application interface and that is newly displayed in the second annotation interface. The interface content of the second application interface may include, from top to bottom, the entire interface content 2-1 that is of the second application interface and that is displayed in the first annotation interface and the interface content 2-2 that is of the second application interface and that is newly displayed in the second annotation interface. The annotation content may include, from top to bottom, the first annotation and the second annotation added by the user.

Application interfaces of some APPs include one or more components with fixed positions. When the APP responds to the scrolling operation, positions of these components do not move accordingly. Interface content of some components is scrollable, and interface content of some components is non-scrollable. For example, text content of APPs such as the Gallery APP, the Contacts APP, and the Notepad APP is scrollable, and content in a navigation bar and a menu bar is non-scrollable. Some APPs include a toolbar, and content in the toolbar is usually non-scrollable. Each component may include one or more controls. For a component whose interface content is scrollable (a scrollable component for short), a position of a control and other content in the component are movable when the APP responds to the scrolling operation of the user. For a component whose interface content is non-scrollable (a non-scrollable component for short), a position of a control and other content in the component are unmovable when the APP responds to the scrolling operation of the user.

For any APP displayed in the first annotation interface, if the APP includes at least one scrollable component with a fixed position and at least one non-scrollable component, for each non-scrollable component, if the non-scrollable component is located on a left side or a right side of the scrollable component, interface filling may be performed at the bottom of interface content of the non-scrollable component during scrolling. If the non-scrollable component is located at the bottom or the top of the scrollable component, the interface content of the non-scrollable component may be fixedly displayed during scrolling, or the interface content of the non-scrollable component may not be displayed. During saving, the non-scrollable component may be spliced at the top or the top of the interface content of the scrollable component, or the interface content of the non-scrollable component may not be saved. An example in which the interface content of the non-scrollable component is not displayed and is saved is subsequently used in this embodiment for description.

If the plurality of components included in the APP are all non-scrollable components, interface filling may be performed at the bottom of interface content of the APP.

The following continues to describe various possible scrolling annotation scenarios when the application interface includes a plurality of components with fixed positions.

Scenario 03: With reference to (a) in FIG. 7, the application interface of the first application includes a component 1 and a component 3 that are horizontally arranged, and the component 3 is located on a left side of the component 1; and the application interface of the second application includes a component 2, where interface content of the component 1 and interface content of the component 2 are both scrollable, and interface content of the component 3 is non-scrollable. For example, the component 1 is a component corresponding to a content area in the first application interface, and the component 1 displays text content. The component 3 is a side toolbar in the first application interface. When the first application responds to the scrolling operation, the interface content in the component 1 may scroll accordingly, and the interface content in the component 3 remains unchanged.

The interface content displayed in the first annotation interface before scrolling includes: interface content 1-1 of the component 1, interface content 2-1 of the component 2, and interface content 3 of the component 3; and the annotation content includes: the first annotation, where the first annotation is located in the middle area of the screen, and the first annotation horizontally crosses the interface content 1-1 and the interface content 2-1.

After the user enters the scrolling operation, the electronic device may scroll up the interface content of the component 1, the interface content of the component 2, the interface content of the component 3, and the annotation layer. The interface content of the component 1 and the interface content of the component 2 are both scrollable, and new interface content may be displayed in a scrolling process. The interface content of the component 3 is non-scrollable, and interface filling may be performed.

Figure 7:
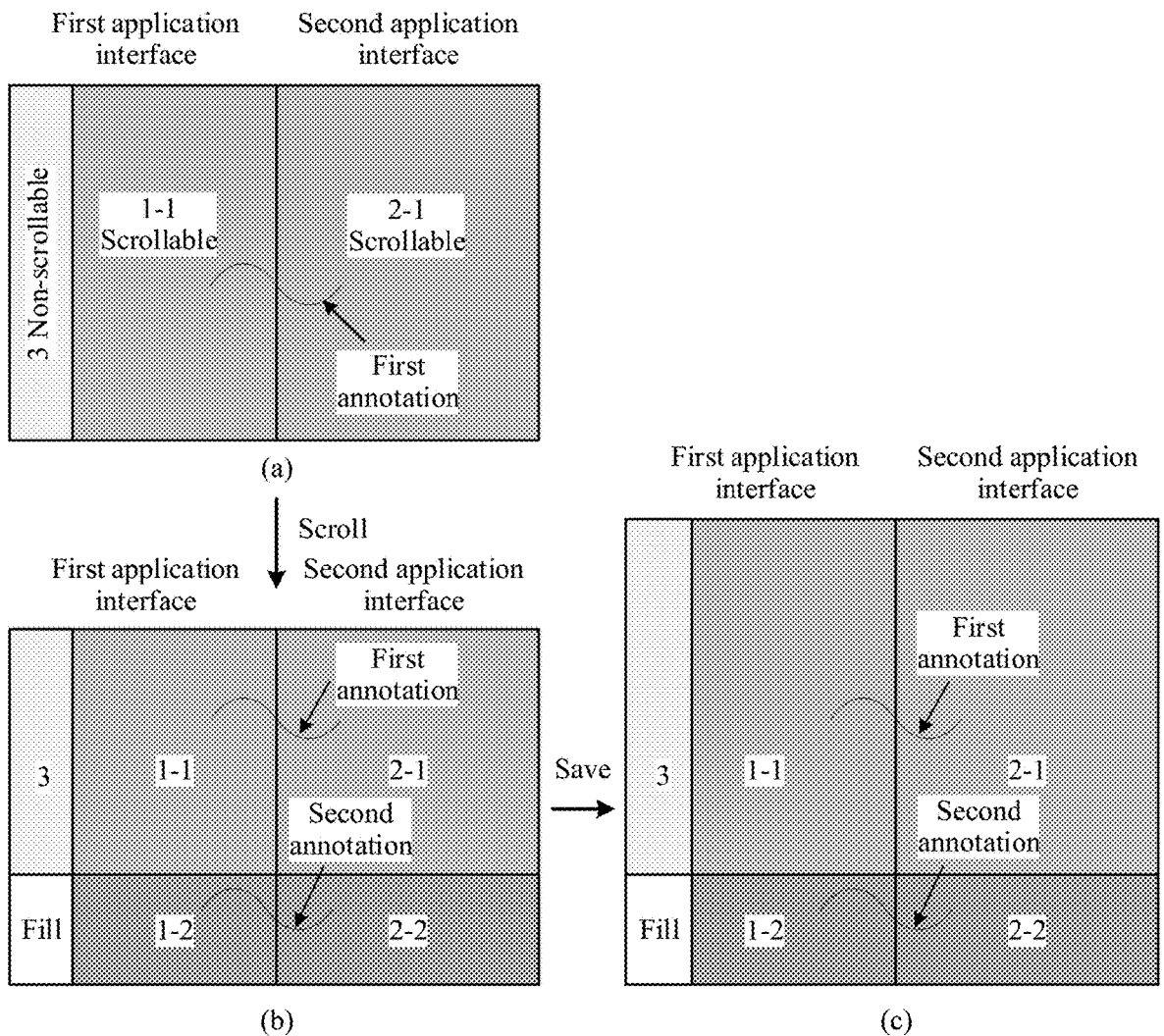

As shown in (b) in FIG. 7, in the second annotation interface displayed after scrolling, the interface content in the first application interface may include left and right parts of content, where the right part of content may include, from top to down, a part of the interface content 1-1 that is of the component 1 and that is displayed in the first annotation interface and newly displayed interface content 1-2 of the component 1; and the left part of content may include, from top to down, a part of the interface content 3 that is of the component 3 and that is displayed in the first annotation interface and filled content of the component 3. The interface content in the second application interface may include, from top to bottom, a part of the interface content 2-1 that is of the second application and that is displayed in the first annotation interface and newly displayed interface content 2-2 of the second application; and the first annotation is synchronously scrolled up, and is moved from the middle area of the screen to the upper area of the screen.

As shown in (b) in FIG. 7, the user may save the annotation interface after adding the second annotation to the second annotation interface, where the second annotation horizontally crosses the interface content 1-2 of the first application interface and the interface content 2-2 of the second application interface. As shown in (c) in FIG. 7, after the electronic device receives the annotation saving operation of the user, in the saved annotation picture, the interface content of the first application interface may include left and right parts of content. The right part of content may include, from top to bottom, the entire interface content 1-1 that is of the first application and that is displayed in the first annotation interface and the interface content 1-2 that is of the first application and that is newly displayed in the second annotation interface. The left part of content may include, from top to bottom, the entire interface content 3 that is of the component 3 and that is displayed in the first annotation interface and filled content that is of the component 3 and that is displayed in the second annotation interface. The interface content of the second application interface may include, from top to bottom, the entire interface content 2-1 that is of the second application and that is displayed in the first annotation interface and the interface content 2-2 that is of the second application and that is newly displayed in the second annotation interface; and the annotation content may include, from top to bottom, the first annotation and the second annotation added by the user.

Scenario 04: With reference to (a) in FIG. 8, the application interface of the first application includes a component 1 and a component 3 that are vertically arranged, and the component 3 is located at the bottom of the component 1. For example, the component 3 is a menu bar in the first application interface. The application interface of the second application includes a component 2, where interface content of the component 1 is scrollable, and interface content of the component 2 and interface content of the component 3 are both non-scrollable. Interface content displayed in the first annotation interface before scrolling includes: interface content 1-1 of the component 1, interface content 2 of the component 2, and interface content 3 of the component 3.

After the user enters the scrolling operation, the electronic device may scroll up the interface content of the component 1, the interface content of the component 2, and the annotation layer, and the interface content of the component 3 is not displayed. The interface content of the component 1 is scrollable, and new interface content may be displayed in a scrolling process. The interface content of the component 2 is non-scrollable, and interface filling may be performed.

Figure 8:
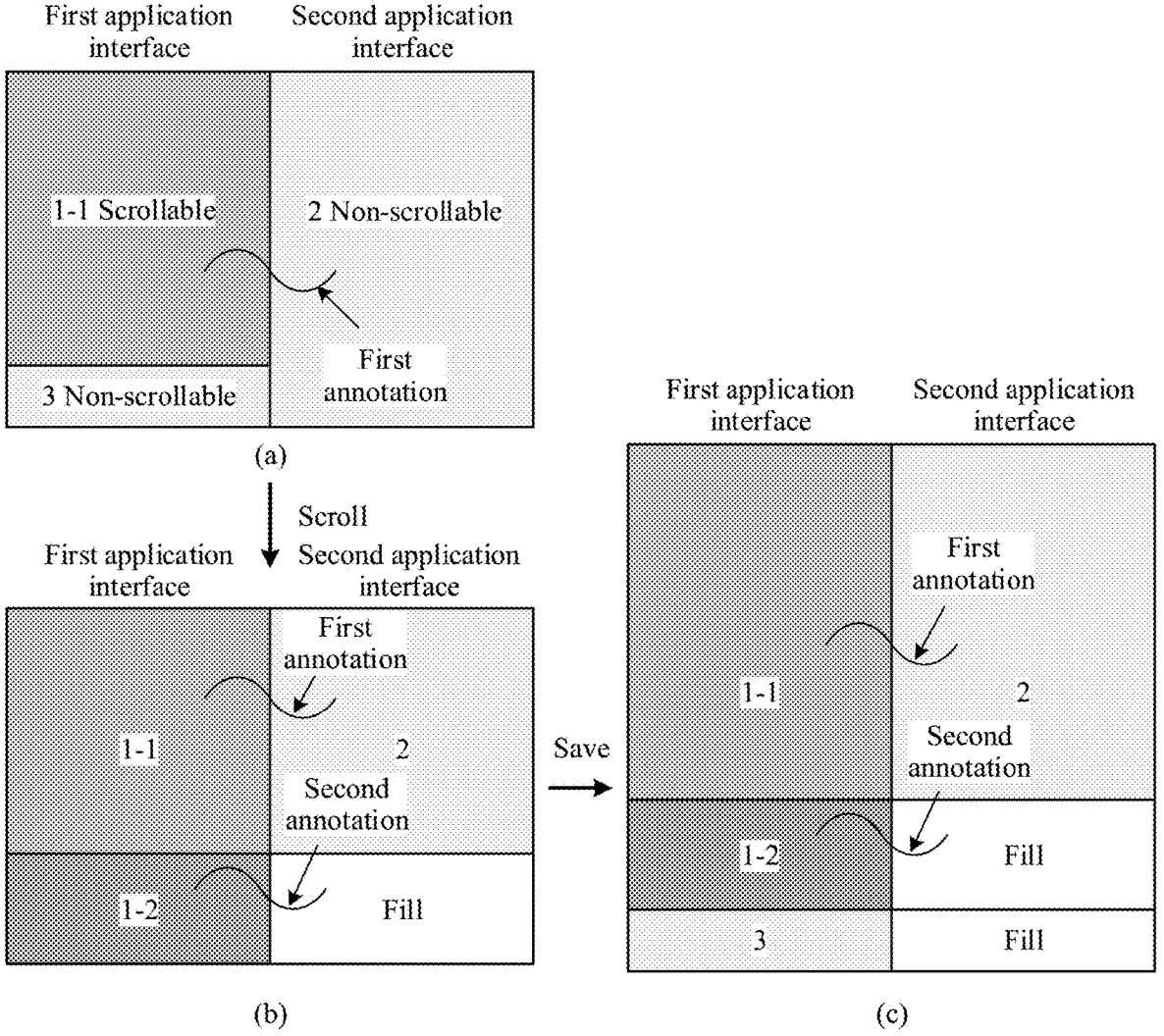

As shown in (b) in FIG. 8, in the second annotation interface displayed after scrolling, the interface content in the first application interface may include, from top to bottom, a part of the interface content 1-1 that is of the component 1 and that is displayed in the first annotation interface and newly displayed interface content 1-2 of the component 1. The interface content of the second application interface may include, from top to bottom, a part of the interface content 2 that is of the second application and that is displayed in the first annotation interface and the filled content of the second application. The first annotation is synchronously scrolled up, and is moved from the middle area of the screen to the upper area of the screen.

As shown in (b) in FIG. 8, the user may save the annotation interface after adding the second annotation to the second annotation interface, where the second annotation horizontally crosses the interface content 1-2 of the first application interface and the filled content of the second application interface. As shown in (c) in FIG. 8, after the electronic device receives the annotation saving operation of the user, in the saved annotation picture, the interface content of the first application interface may include, from top to bottom, the entire interface content 1-1 that is of the first application and that is displayed in the first annotation interface, the interface content 1-2 that is of the first application and that is newly displayed in the second annotation interface, and the entire interface content 3 that is of the component 3 and that is displayed in the first annotation interface. The interface content of the second application interface may include, from top to bottom, the entire interface content 2 that is of the second application and that is displayed in the first annotation interface and the filled content displayed in the second annotation interface. The annotation content may include, from top to bottom, the first annotation and the second annotation added by the user.

Scenario 05: With reference to (a) in FIG. 9, the application interface of the first application includes a component 1 and a component 3 that are vertically arranged, and the component 3 is located at the bottom of the component 1. The application interface of the second application includes a component 2, where interface content of the component 1 and interface content of the component 2 are both scrollable, and interface content of the component 3 is non-scrollable. Interface content displayed in the first annotation interface before scrolling includes: interface content 1-1 of the component 1, interface content 2-1 of the component 2, and interface content 3 of the component 3.

After the user enters the scrolling operation, the electronic device may scroll up the interface content of the component 1, the interface content of the component 2, and the annotation layer, and the interface content of the component 3 is not displayed. The interface content of the component 1 and the interface content of the component 2 are both scrollable, and new interface content may be displayed in a scrolling process.

Figure 9:
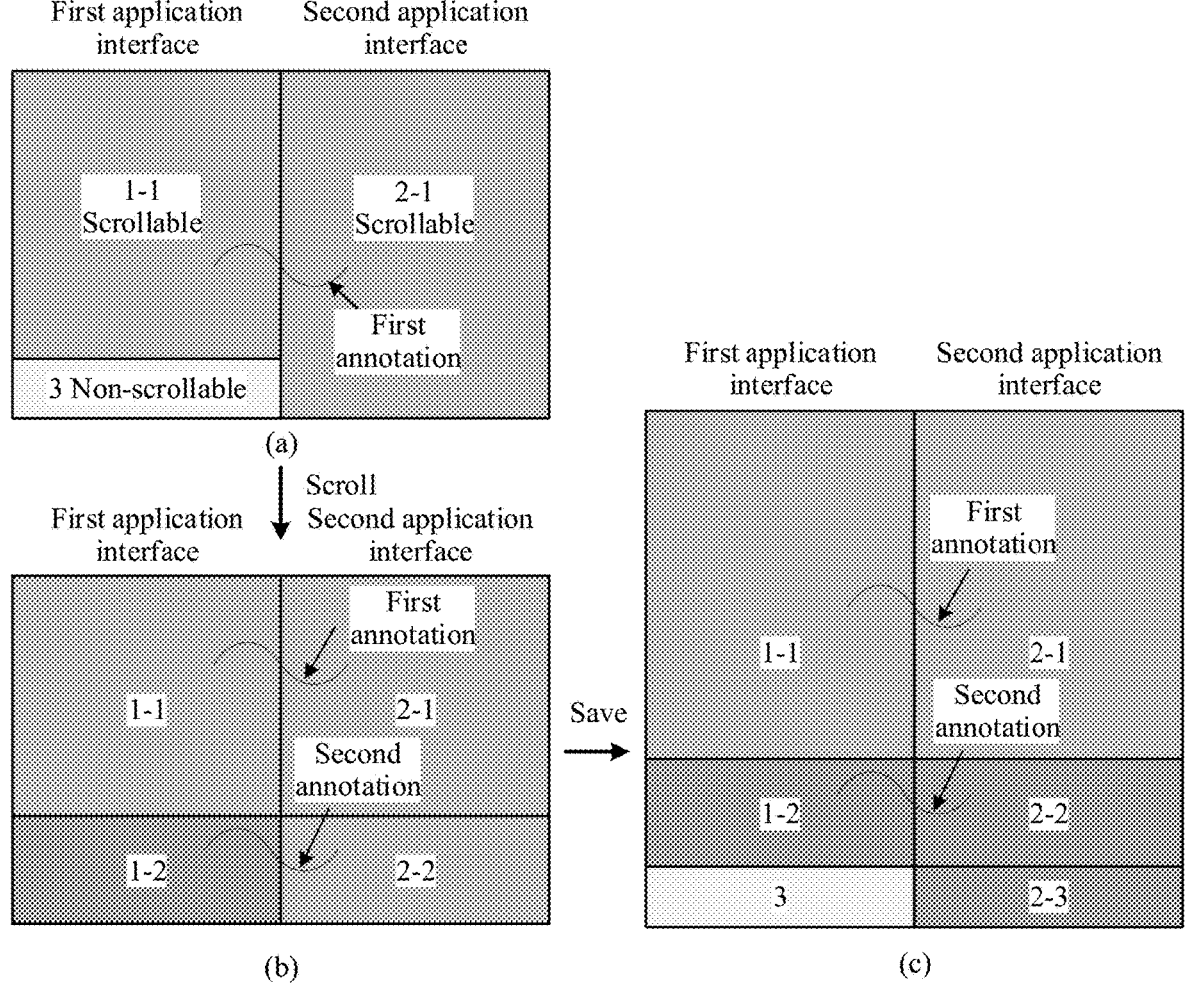

As shown in (b) in FIG. 9, in the second annotation interface displayed after scrolling, the interface content in the first application interface may include, from top to bottom, a part of the interface content 1-1 that is of the component 1 and that is displayed in the first annotation interface and newly displayed interface content 1-2 of the component 1. The interface content of the second application interface may include, from top to bottom, a part of the interface content 2-1 that is of the second application and that is displayed in the first annotation interface and the newly displayed interface content 2-2 of the second application. The first annotation is synchronously scrolled up, and is moved from the middle area of the screen to the upper area of the screen.

As shown in (b) in FIG. 9, the user may save the annotation interface after adding the second annotation to the second annotation interface, where the second annotation horizontally crosses the interface content 1-2 of the first application interface and the interface content 2-2 of the second application interface. As shown in (c) in FIG. 9, after the electronic device receives the annotation saving operation of the user, in the saved annotation picture, the interface content of the first application interface may include, from top to bottom, the entire interface content 1-1 that is of the first application and that is displayed in the first annotation interface, the interface content 1-2 that is of the first application and that is newly displayed in the second annotation interface, and the entire interface content 3 that is of the component 3 and that is displayed in the first annotation interface. The interface content of the second application interface may include, from top to bottom, the entire interface content 2-1 that is of the second application and that is displayed in the first annotation interface, the interface content 2-2 that is of the second application and that is newly displayed in the second annotation interface, and interface content 2-3 that is of the second application and that is newly displayed corresponding to the component 3. The annotation content may include, from top to bottom, the first annotation and the second annotation added by the user.

That is, during saving, if the interface content of the component 3 is spliced at the bottom of the interface content 1-2 of the component 1, a part of the interface content may continue to be displayed after the interface content 2-2 of the component 2, so that lengths of the first application interface and the second application interface in the saved annotation picture are consistent. It may be understood that interface filling may also be performed at the bottom of the interface content 2-2 of the component 2.

Scenario 06: With reference to (a) in FIG. 10, the application interface of the first application includes a component 1 and a component 3 that are vertically arranged, and the component 3 is located at the bottom of the component 1. The application interface of the second application includes a component 2 and a component 4 that are vertically arranged, and the component 4 is located at the bottom of the component 2. Interface content of the component 1 and interface content of the component 2 are both scrollable, and interface content of the component 3 and interface content of the component 4 are both non-scrollable. Interface content displayed in the first annotation interface before scrolling includes: interface content 1-1 of the component 1, interface content 2-1 of the component 2, interface content 3 of the component 3, and interface content 4 of the component 4.

After the user enters the scrolling operation, the electronic device may scroll up the interface content of the component 1, the interface content of the component 2, and the annotation layer, and the interface content of the component 3 and the interface content of the component 4 is not displayed. The interface content of the component 1 and the interface content of the component 2 are both scrollable, and new interface content may be displayed in a scrolling process.

Figure 10:
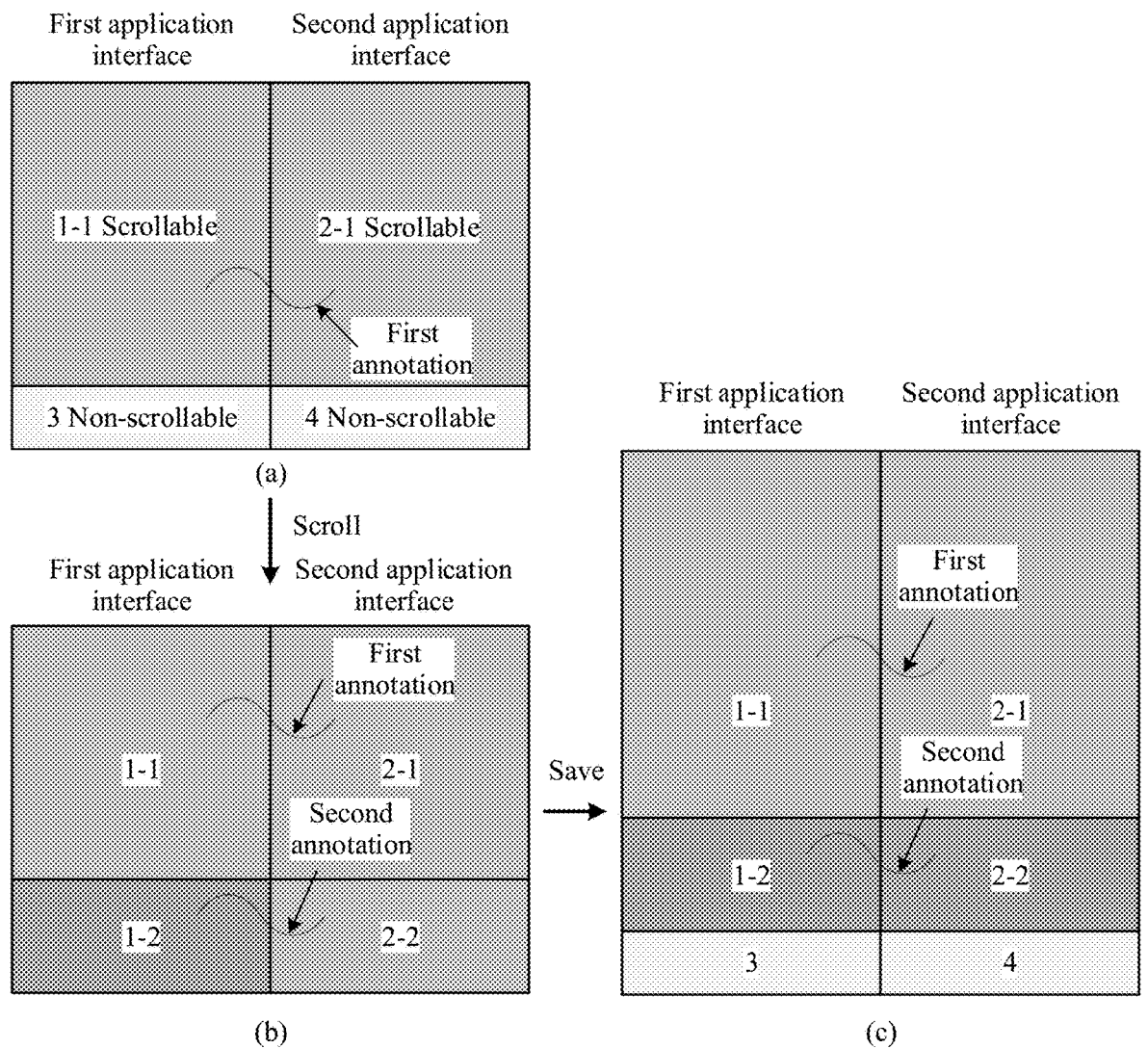

As shown in (b) in FIG. 10, in the second annotation interface displayed after scrolling, the interface content in the first application interface may include, from top to bottom, a part of the interface content 1-1 that is of the component 1 and that is displayed in the first annotation interface and newly displayed interface content 1-2 of the component 1. The interface content of the second application interface may include, from top to bottom, a part of the interface content 2-1 that is of the second application and that is displayed in the first annotation interface and the newly displayed interface content 2-2 of the second application. The first annotation is synchronously scrolled up, and is moved from the middle area of the screen to the upper area of the screen.

As shown in (b) in FIG. 10, the user may save the annotation interface after adding the second annotation to the second annotation interface, where the second annotation horizontally crosses the interface content 1-2 of the first application interface and the interface content 2-2 of the second application interface. As shown in (c) in FIG. 10, after the electronic device receives the annotation saving operation of the user, in the saved annotation picture, the interface content of the first application interface may include, from top to bottom, the entire interface content 1-1 that is of the first application and that is displayed in the first annotation interface, the interface content 1-2 that is of the first application and that is newly displayed in the second annotation interface, and the entire interface content 3 that is of the component 3 and that is displayed in the first annotation interface. The interface content of the second application interface may include, from top to bottom, the entire interface content 2-1 that is of the second application and that is displayed in the first annotation interface, the interface content 2-2 that is of the second application and that is newly displayed in the second annotation interface, and the entire interface content 4 that is of the component 4 and that is displayed in the first annotation interface. The annotation content may include, from top to bottom, the first annotation and the second annotation added by the user.

FIG. 10 is described by using an example in which heights of the component 3 and the component 4 are the same. It may be understood that heights of the component 3 and the component 4 may alternatively be different. In this case, to make the saved annotation picture more aesthetic, a part of interface content may be newly displayed above the component with a lower height in the component 3 and the component 4, so that lengths of the first application interface and the second application interface in the saved annotation picture are consistent. For example, if the height of the component 3 is lower than the height of the component 4, a part of interface content may continue to be displayed after the interface content 1-2 of the component 1.

In another optional implementation, after receiving the scrolling operation of the user, the electronic device may display, in a scrolling manner, only an application interface on which the scrolling operation is performed, and the other application interface may not be scrolled, that is, the application interfaces are scrolled asynchronously. During saving, interface filling may be performed, so that lengths of the application interfaces are consistent. Cross-screen annotation may be prohibited when the user adds an annotation. The following uses the scenario 02 as an example for description.

Figure 11:
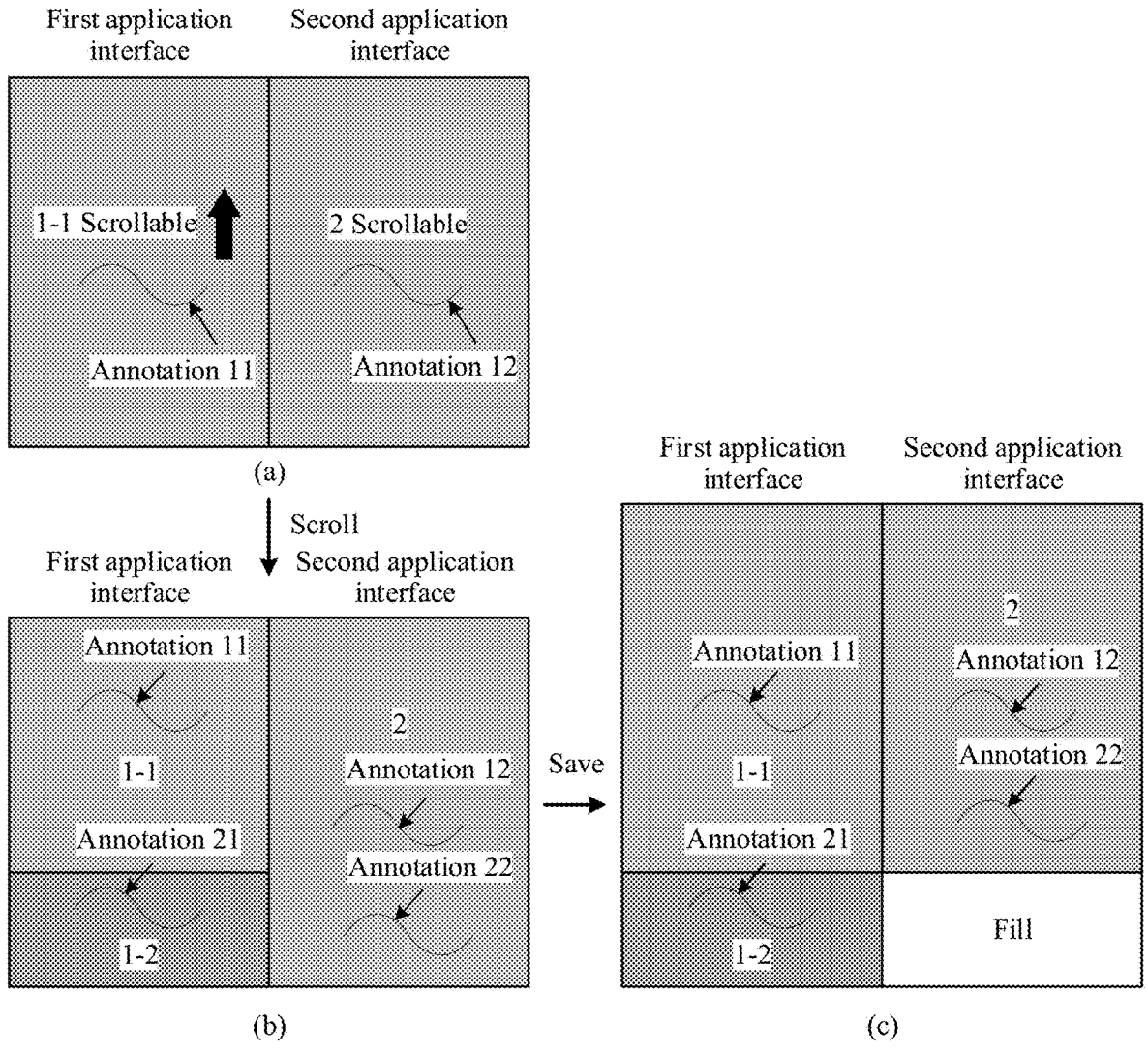

With reference to (a) in FIG. 11, interface content of the first application and interface content of the second application are both scrollable, and interface content displayed in the first annotation interface before scrolling includes: interface content 1-1 of the first application and interface content 2 of the second application; and the first annotation includes: an annotation 11 and an annotation 12, where the annotation 11 is located in a middle area of the interface content 1-1, and the annotation 12 is located in a middle area of the interface content 2.

The user enters the scrolling operation (represented by a black bold upward arrow in the figure) in the first application interface, and the electronic device may scroll up the interface content of the first application interface. As shown in (b) in FIG. 11, in the second annotation interface displayed after scrolling, the interface content in the first application interface may include, from top to bottom, a part of the interface content 1-1 that is of the first application and that is displayed in the first annotation interface and newly displayed interface content 1-2 of the first application, and the interface content in the second application interface remains unchanged.

As shown in (b) in FIG. 11, the user may save the annotation interface after adding the second annotation in the second annotation interface, where the second annotation includes an annotation 21 and an annotation 22, the annotation 21 is located on the interface content 1-2, and the annotation 22 is located on the interface content 2 and below the annotation 12. As shown in (c) in FIG. 11, after the electronic device receives the annotation saving operation of the user, in the saved annotation picture, the interface content of the first application interface may include, from top to bottom, the entire interface content 1-1 that is of the first application and that is displayed in the first annotation interface and the interface content 1-2 that is of the first application and that is newly displayed in the second annotation interface. The interface content of the second application interface may include, from top to bottom, the entire interface content 2 that is of the second application and that is displayed in the first annotation interface and the filled content of the second application. The annotation content may include: the annotation 11 and the annotation 21 located in the first application interface and the annotation 12 and the annotation 22 located in the second application interface.

The foregoing describes the asynchronous scrolling process by using the scenario 02 as an example. An asynchronous scrolling process in another scenario is similar, and details are not described herein again.

The following describes the up-down split-screen scenario.

Similar to left-right split screens, application interfaces of different APPs may be displayed in up-down split screens, and application interfaces of a same APP may also be displayed in up-down split screens. This is not particularly limited in this embodiment. The following describes a scrolling annotation process by using an example in which an upper screen displays the first application interface and a lower screen displays the second application interface.

When the electronic device receives the scrolling operation of the user, an annotation added by the user may exist on the annotation interface, or may not exist on the annotation interface. In addition, the annotation added by the user may cross screens, that is, the annotation vertically crosses the first application interface and the second application interface, or the annotation added by the user may not cross screens, that is, the annotation is located in the first application interface or the second application interface. The following separately describes these cases.

Figure 12:
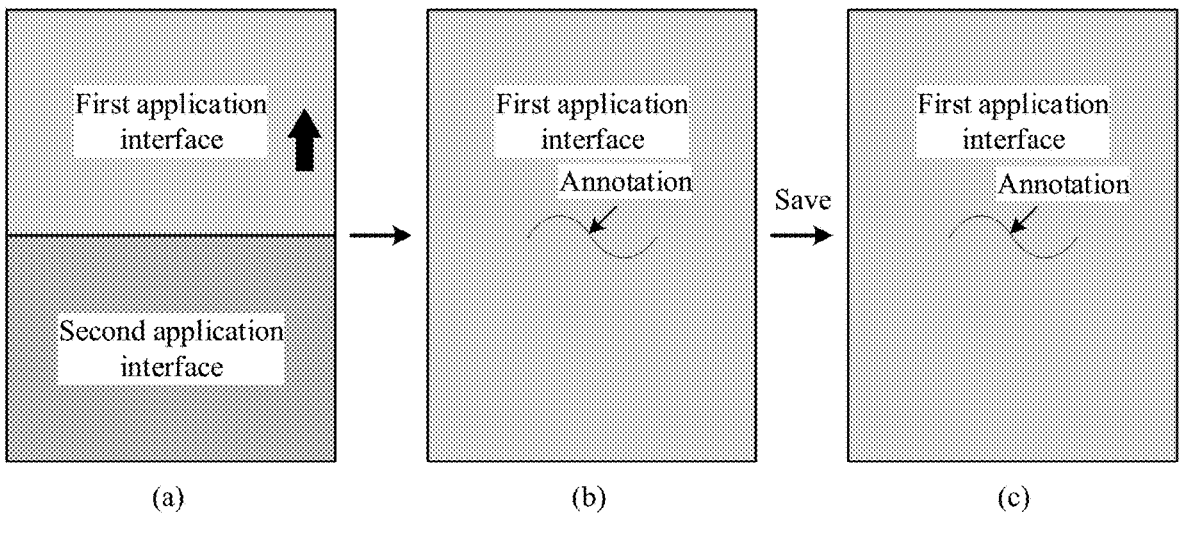

Scenario 11: With reference to (a) in FIG. 12, when the electronic device receives the scrolling operation of the user, there is no annotation on the annotation interface. In this case, the electronic device may display, in full screen, an APP on which the scrolling operation of the user is performed. For example, as shown in (a) and (b) in FIG. 12, after the user enters the scrolling operation in the first application interface, the electronic device displays the first application interface in full screen.

Similar to a current full-screen annotation process, the user may add an annotation, scroll an interface, and the like for the first application interface on the screen. After the user enters the annotation saving operation, the electronic device may combine the interface content of the first application interface displayed in the annotation process and the annotation added by the user into an annotation picture for saving. For example, as shown in (b) in FIG. 12, after adding the annotation on the first application interface, the user saves the annotation interface, where the annotation added by the user is located in a middle area of the first application interface. As shown in (c) in FIG. 12, after the electronic device receives the annotation saving operation of the user, the saved annotation picture may include: interface content of the first application interface displayed in full screen and the annotation added by the user.

Figure 13:
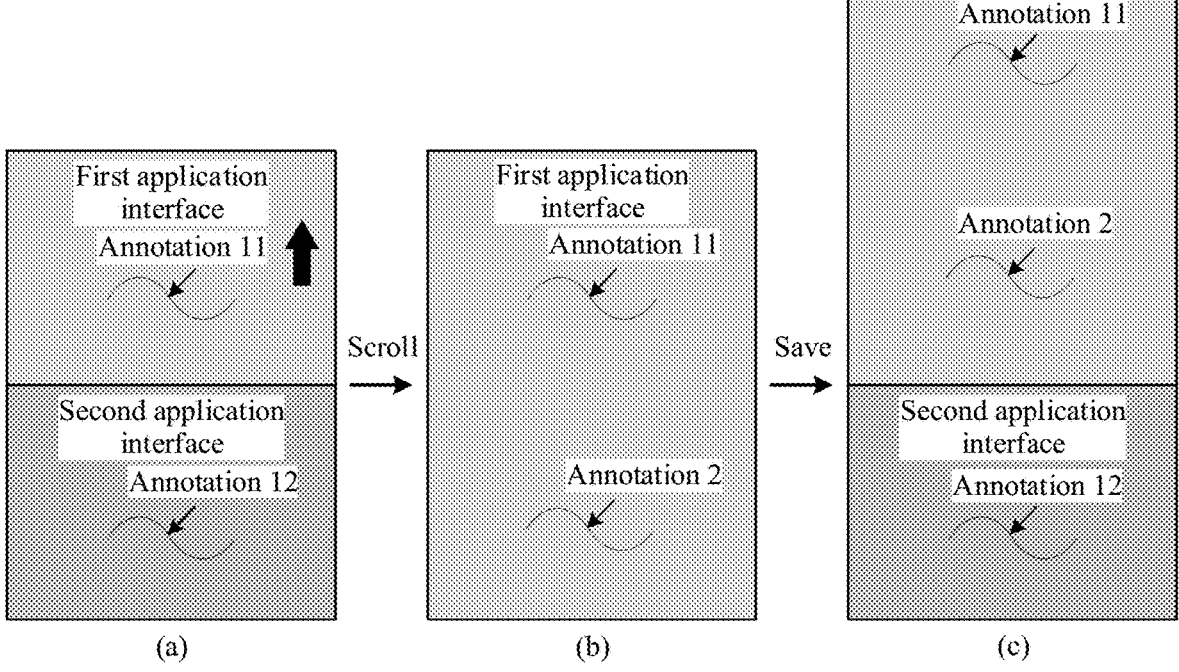

Scenario 12: With reference to (a) in FIG. 13, when the electronic device receives the scrolling operation of the user, the annotation interface includes an annotation 11 and an annotation 12, the annotation 11 is located in the first application interface, the annotation 12 is located in the second application interface, and neither the annotation 11 nor the annotation 12 crosses screens. In this case, the electronic device may display, in full screen, an APP on which the scrolling operation of the user is performed. For example, as shown in (a) and (b) in FIG. 13, after the user enters the scrolling operation in the first application interface, the electronic device displays the first application interface in full screen.

Then, the user may add an annotation, scroll an interface, and the like for the first application interface on the screen. After the user enters the annotation saving operation, the electronic device may combine the first application interface displayed in the annotation process and the annotation added by the user on the first application interface into a first annotation picture, and combine the second application interface displayed in the annotation process and the annotation added by the user on the second application interface into a second annotation picture, and then splice the second annotation picture at the bottom of the first annotation picture for saving. For example, as shown in (b) in FIG. 13, after adding the annotation 2 on the first application interface, the user saves the annotation interface, where the annotation 2 is located below the annotation 11. As shown in (c) in FIG. 13, after the electronic device receives the annotation saving operation of the user, interface content in the saved annotation picture may include, from top to bottom, interface content of the first application interface displayed in full screen and interface content of the second application interface displayed before scrolling, and the annotation content may include: the annotation 11 and the annotation 2 located on the first application interface, and the annotation 12 located on the second application interface.

Scenario 13: With reference to (a) in FIG. 14, when the electronic device receives the scrolling operation of the user for the first application interface, the annotation interface includes an annotation 1, and the annotation 1 crosses screens. In this case, as shown in (b) in FIG. 14, the electronic device may prompt, by using a pop-up window, the user whether to save the current annotation content. After the user completes selection, as shown in (c) in FIG. 14, the first application interface is displayed in full screen.

Similar to the foregoing scenario, the user may add an annotation, scroll an interface, and the like for the first application interface on the screen. After the user enters the annotation saving operation, the electronic device may combine the first application interface displayed in the annotation process and the annotation added by the user on the first application interface into an annotation picture for saving. In addition, if the user selects to save the current annotation content in the interface shown in (b) in FIG. 14, the electronic device may simultaneously combine the application interface and the annotation 1 shown in (a) in FIG. 14 into an annotation picture for saving. For example, as shown in (b) and (c) in FIG. 14, after the user selects an option of "Yes", and adds an annotation 2 on the first application interface, the annotation interface is saved, where the annotation 2 is located below the annotation 1. As shown in (d) and (e) in FIG. 14, after the electronic device receives the annotation saving operation of the user, one of the saved annotation pictures may include: the first application interface displayed in full screen, the annotation 1, and the annotation 2. The other saved annotation picture may include: the first application interface and the second application interface that are displayed from top to bottom before scrolling, and the annotation 1 that vertically crosses the first application interface and the second application interface.

Figure 14:
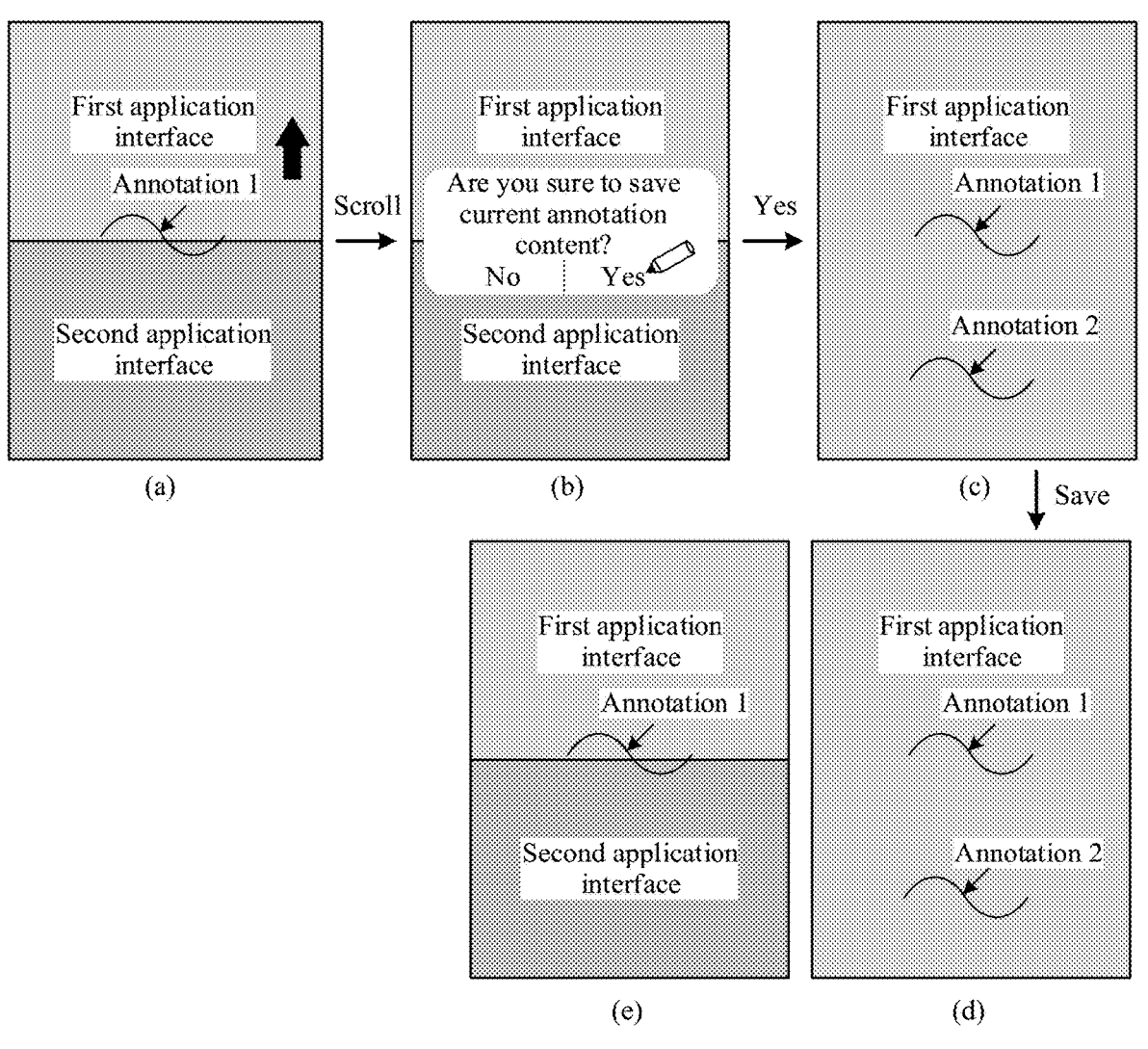

It may be understood that, in (c) in FIG. 14, when the electronic device displays the first application interface in full screen, the annotation 1 may not be displayed.

Figure 15:
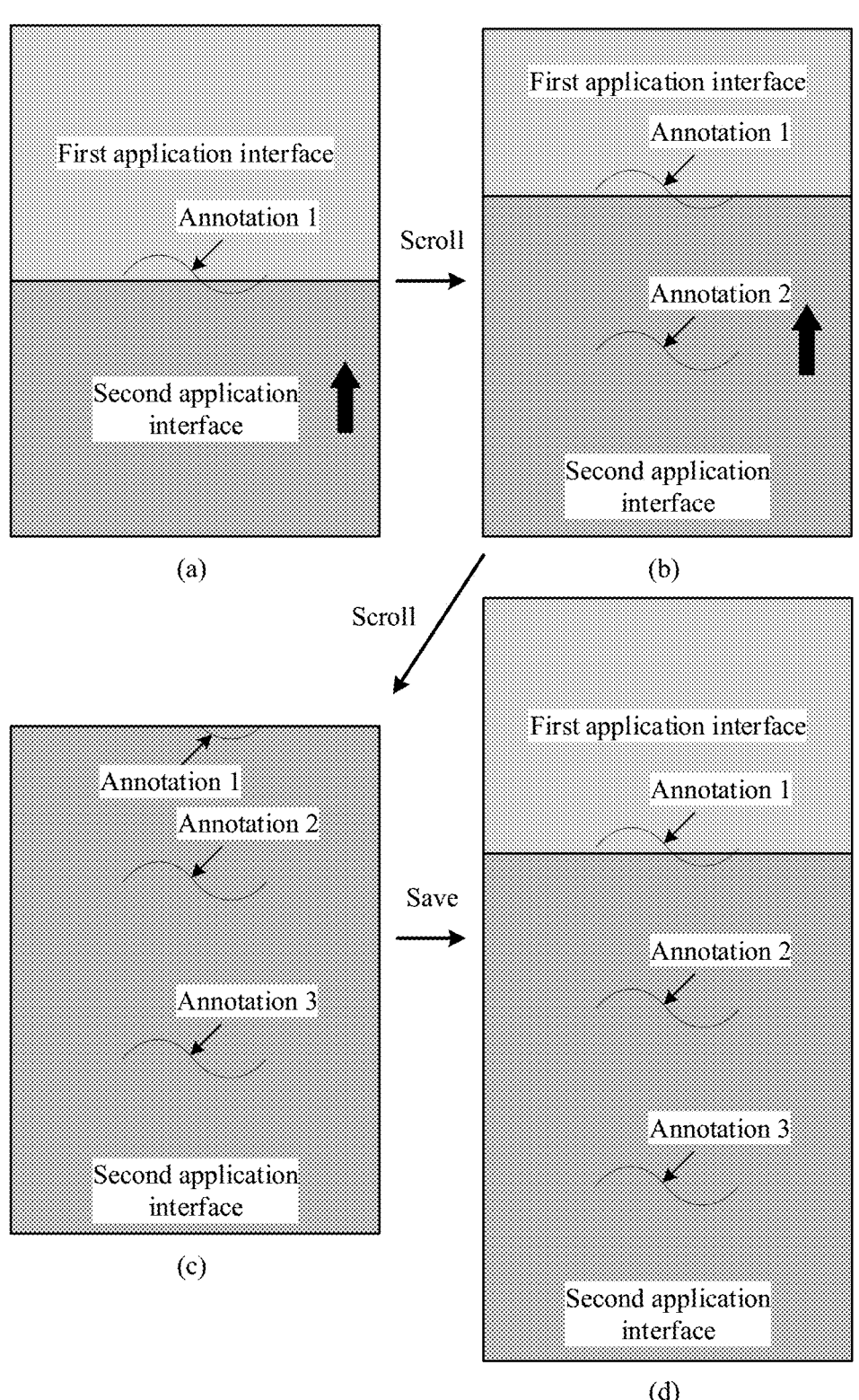

Scenario 14: With reference to (a) in FIG. 15, when the electronic device receives the scrolling operation of the user for the second application interface, the annotation interface includes an annotation 1, and the annotation 1 crosses screens. In this case, as shown in (b) in FIG. 15, the electronic device may scroll up the first application interface and the second application interface. In a scrolling process, interface content of the first application interface shown in (a) in FIG. 15 is gradually hidden from top to bottom, and new interface content is continuously displayed on the second application interface.

As shown in (b) in FIG. 15, after adding an annotation 2 in the interface, the user scrolls the interface again, where the annotation 2 is located in the second application interface and is located below the annotation 1. After the user scrolls the interface, as shown in (c) in FIG. 15, the interface content of the first application interface shown in (a) in FIG. 15 is completely hidden, and the second application interface is presented in a full-screen display state; the annotation 1 and the annotation 2 are scrolled up synchronously, the annotation 1 is scrolled to the top of the screen, and the part located in the first application interface is hidden, and the annotation 2 is scrolled to the upper area of the screen. After the user continues to add an annotation 3, the annotation interface is saved, where the annotation 3 is located below the annotation 2. After receiving the annotation saving operation of the user, the electronic device may combine the application interface displayed in the annotation process and the annotation added by the user into an annotation picture for saving. As shown in (d) in FIG. 15, the interface content in the saved annotation picture may include, from top to down, interface content that is of the first application interface and the second application interface and that is displayed before scrolling, and interface content that is of the second application interface and that is newly displayed after scrolling is performed twice, and the annotation content may include, from top to bottom, the annotation 1 that vertically crosses the first application interface and the second application interface and the annotation 2 and the annotation 3 that are located in the second application interface.

The following describes the floating window scenario.

Figure 16:
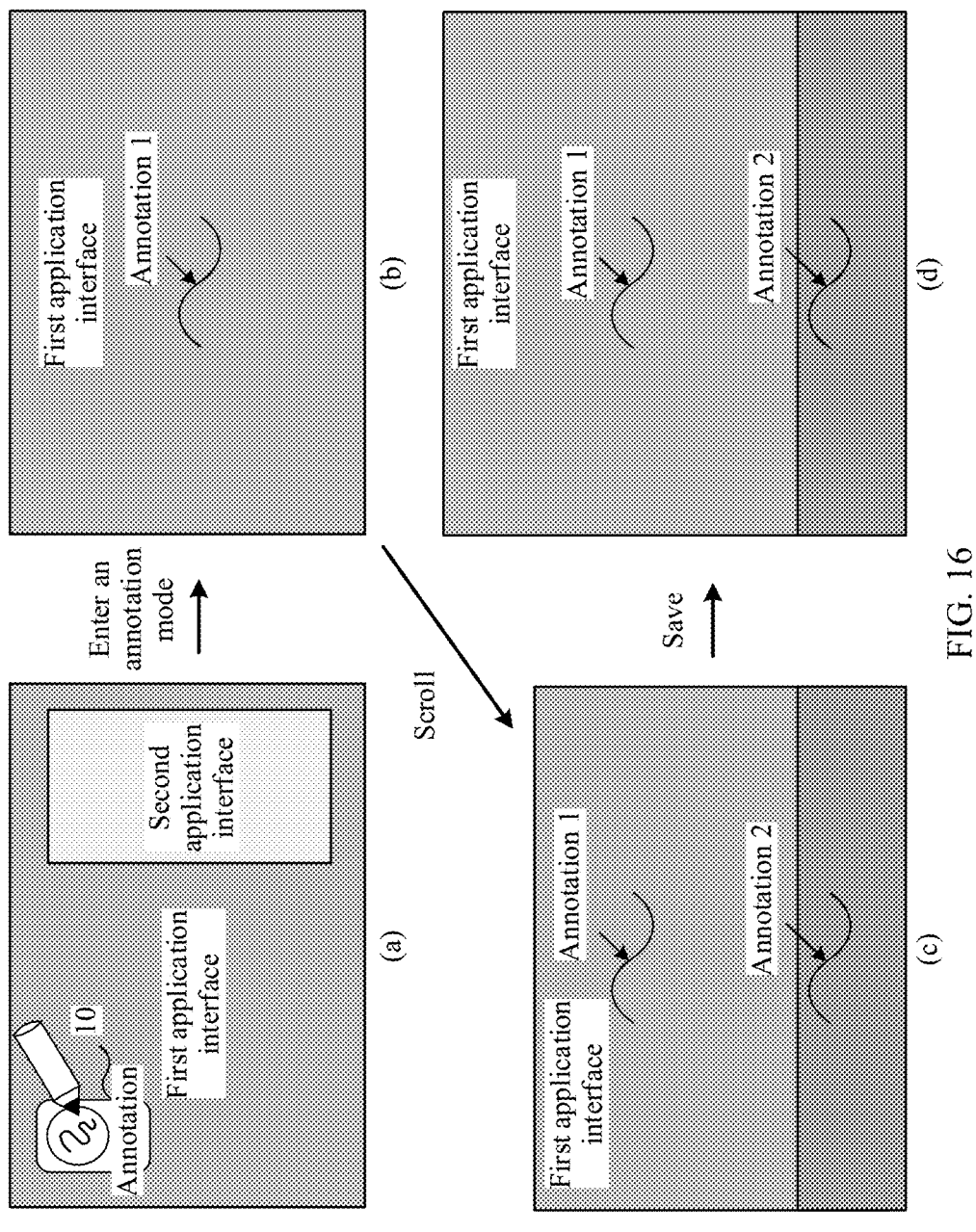

As shown in (a) in FIG. 16, the electronic device displays the first application interface in full screen, and displays the second application interface in a floating window. In this scenario, the user taps an annotation control in the floating menu 10. As shown in (b) in FIG. 16, after receiving the annotation triggering operation of the user, the electronic device enters the annotation mode, and the floating window may be hidden.

The user may add an annotation, scroll an interface, and the like for the first application interface on the screen. After the user enters the annotation saving operation, the electronic device may combine the first application interface displayed in the annotation process and the annotation added by the user into an annotation picture for saving. For example, as shown in (b) in FIG. 16, after the user adds the annotation 1 on the first application interface, the interface is scrolled, where the annotation 1 is located in the middle part of the screen. As shown in (c) in FIG. 16, after receiving the scrolling operation of the user, the electronic device scrolls interface content of the first application interface, and new interface content of the first application interface is displayed in the lower part of the screen. In addition, the annotation 1 is synchronously scrolled to the upper part of the screen. The user continues to add an annotation 2 on the first application interface, and then saves the annotation interface, where the annotation 2 is located on the newly displayed interface content. As shown in (d) in FIG. 16, after the electronic device receives the annotation saving operation of the user, interface content in the saved annotation picture may include, from top to bottom, interface content that is of the first application interface and that is displayed before scrolling, and interface content that is of the first application interface and that is newly displayed after scrolling, and the annotation content may include, from top to bottom, the annotation 1 and the annotation 2.

Figure 17:
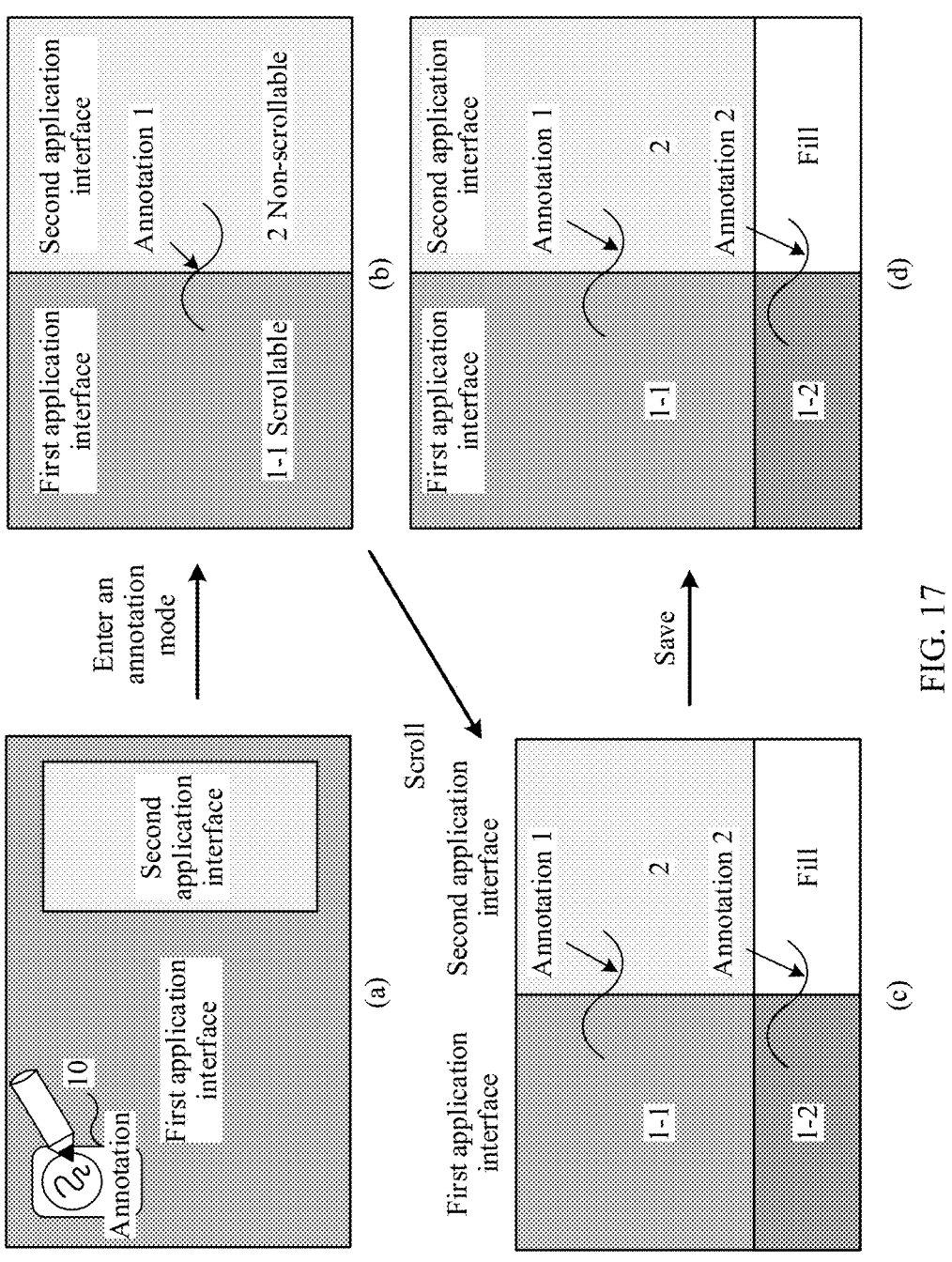

In another optional implementation, as shown in (a) and (b) in FIG. 17, the electronic device displays the first application interface in full screen, and displays the second application interface in the floating window. In this scenario, the user enters the annotation triggering operation by tapping the annotation control in the floating menu 10. After entering the annotation mode, the electronic device may display the first application interface and the second application interface in a split-screen manner. Herein, the left-right split-screen manner is used as an example. It may be understood that the split-screen manner may alternatively be an up-down split-screen manner during screen splitting.

A scrolling annotation process in the split-screen scenario is similar to that in the foregoing split-screen scenario. The following uses the foregoing scenario 01 as an example for description.

As shown in (b) in FIG. 17, interface content 1-1 of the first application is scrollable, and interface content 2 of the second application is non-scrollable. After adding an annotation 1, the user enters the scrolling operation, where the annotation 1 is located in the middle part of the screen and horizontally crosses the first application interface and the second application interface. As shown in (c) in FIG. 17, after receiving the scrolling operation, the electronic device scrolls up the interface content of the first application interface, the interface content of the second application interface, and the annotation layer, and performs interface filling at the bottom of the interface content of the second application. In an interface obtained after scrolling, the interface content in the first application interface may include, from top to bottom, a part of the interface content 1-1 of the first application shown in (b) in FIG. 17 and newly displayed interface content 1-2 of the first application. The interface content in the second application interface may include, from top to bottom, a part of the interface content 2 of the second application and the filled content of the second application. The annotation 1 is scrolled up synchronously, and scrolls from the middle part of the screen to the upper part of the screen.

After adding an annotation 2, the user enters the annotation saving operation to save the annotation interface, where the annotation 2 horizontally crosses an area in which the interface content 1-2 of the first application interface is located and an area in which the filled content of the second application interface is located. As shown in (d) in FIG. 17, in the saved annotation picture, the interface content of the first application interface may include, from top to bottom, the entire interface content 1-1 shown in (b) in FIG. 17, and the newly displayed interface content 1-2 of the first application in (c) in FIG. 17. The interface content of the second application interface may include, from top to bottom, the entire interface content 2 of the second application and the filled content of the second application. The annotation content may include, from top to bottom, the annotation 1 and the annotation 2 added by the user.

In the annotation method provided in this embodiment, the electronic device may enter the annotation mode in a multi-window scenario for the user to perform annotation. In this way, application scenarios of an annotation function can be enriched, flexibility of annotation performed by the user can be improved, and annotation experience of the user can be improved.

Figure 18:
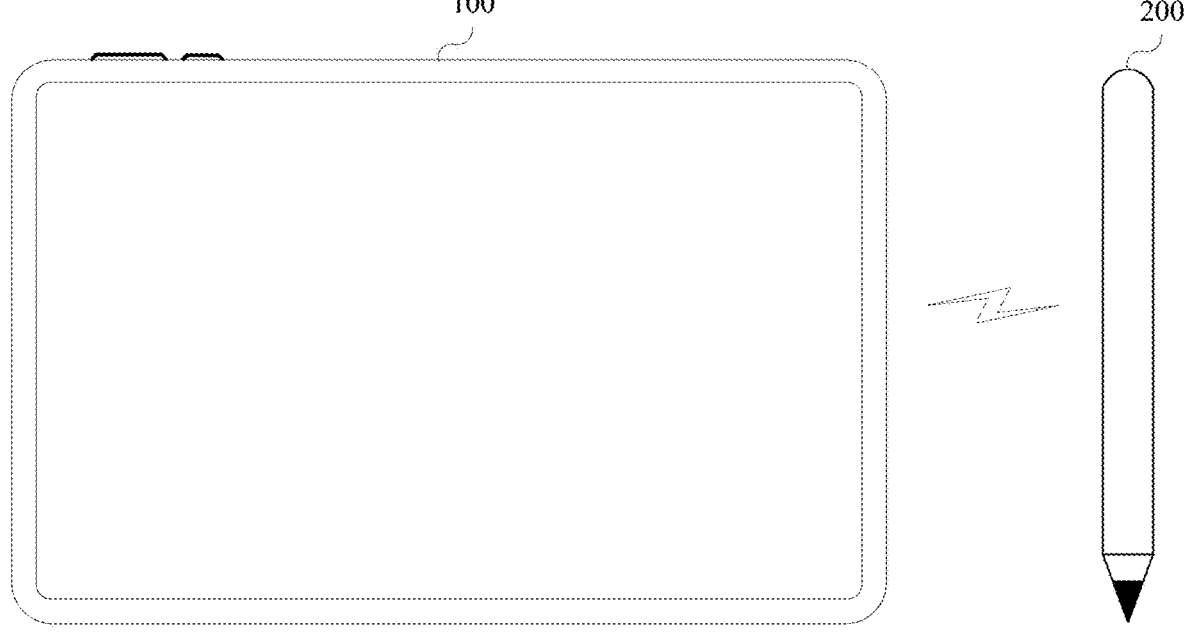
FIG. 18 is a schematic diagram of a structure of an interaction system according to an embodiment of this application.

Based on a same concept, in an implementation of the foregoing method, an embodiment of this application provides an interaction system. FIG. 18 is a schematic diagram of a structure of an interaction system according to an embodiment of this application. As shown in FIG. 18, the interaction system may include an electronic device 100 and a stylus 200.

The electronic device 100 may be a display device such as a mobile phone, a tablet computer, a notebook computer, or an e-reader. The stylus 200 may be a resistive stylus 200, a capacitive stylus 200, or the like.

The electronic device 100 may communicate with the stylus 200 in a wireless communication manner such as Bluetooth or a wireless fidelity (wireless fidelity, Wi-Fi) network.

One or more keys may be disposed on the stylus 200, and the keys may be physical keys or virtual keys. The user may control, by using a key on the stylus 200, the stylus 200 to perform a corresponding operation. For example, after the user taps a first key, the stylus 200 establishes a communication connection to the electronic device 100; and after the user taps a second key, the electronic device 100 enters an annotation mode.

After the electronic device 100 establishes communication with the stylus 200, the user may enter a touch operation by using the stylus 200. In the annotation mode, the electronic device 100 may display a moving track formed by the stylus 200 on a screen.

A software system of the electronic device 100 may use a layered architecture, an event-driven architecture, a micro-kernel architecture, a micro service architecture, or a cloud architecture. In an embodiment of the present invention, a software structure of the electronic device 100 is described by using an Android system with a layered architecture as an example.

Figure 19:
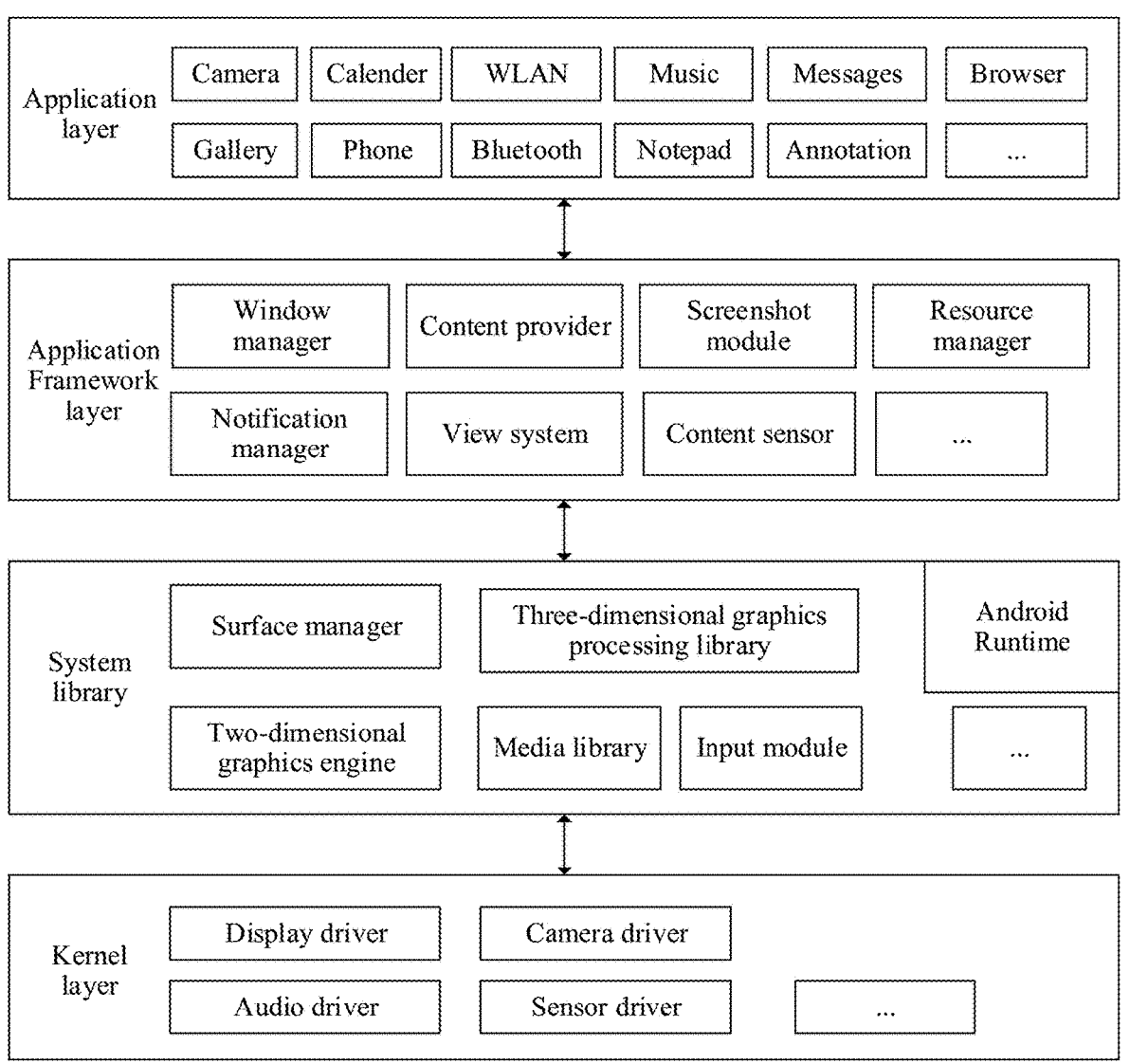
FIG. 19 is a schematic diagram of a software architecture of an electronic device according to an embodiment of this application.

FIG. 19 is a schematic diagram of a software architecture of an electronic device 100 according to an embodiment of this application. As shown in FIG. 19, a software system of the electronic device 100 may be divided into several layers. In some embodiments, the Android system may be divided into an application layer, an application framework layer, an Android Runtime (Android Runtime) and a system library, and a kernel layer from top to bottom.

The application layer may include a series of applications. As shown in FIG. 19, the applications may include Camera, Gallery, Calendar, Phone, WLAN, Bluetooth, Music, Notepad, Messages, Annotation, Browser, and the like.

The application framework layer provides an application programming interface (application programming interface, API) and a programming framework for an application at the application layer. The application framework layer includes some predefined functions.

As shown in FIG. 19, the application framework layer may include a window manager, a content provider, a view system, a resource manager, a notification manager, a screenshot module, and the like.

The window manager is configured to manage a window program. The window manager may obtain a size of a display, determine whether there is a status bar, lock the screen, capture the screen, and the like. The content provider is configured to: store and obtain data, and enable the data to be accessed by an application. The data may include a video, an image, audio, calls made and answered, a browse history and a bookmark, a personal address book, and the like. The view system includes a visual control, for example, a control for displaying text or a control for displaying a picture. The view system may be configured to construct an application. A display interface may include one or more views. For example, a display interface including a notification icon of Messages may include a text display view and a picture display view. The resource manager provides various resources for an application, such as a localized string, an icon, a picture, a layout file, and a video file. The notification manager enables an application to display, in the status bar, notification information, which may be used for conveying a notification-type message that may automatically disappear after a short stay without user interaction. For example, the notification manager is configured to: notify download completion, provide a message prompt, and the like. The notification manager may alternatively be a notification that appears in a top status bar of the system in a form of a graph or scroll bar text, for example, a notification of an application running on the background or a notification that appears on the screen in a form of a dialog window. For example, text information is displayed in the status bar, an alert tone is given, the electronic device 100 vibrates, or an indicator light flashes.

The screenshot module may take a screenshot of the display interface of the electronic device 100.

The Android Runtime includes a core library and a virtual machine. The Android Runtime is responsible for scheduling and management of the Android system. The core library includes two parts: a function that needs to be invoked in java language and a core library of Android.

The application layer and the application framework layer run in the virtual machine. The virtual machine executes java files at the application layer and the application framework layer as binary files. The virtual machine is configured to execute functions such as object life cycle management, stack management, thread management, security and exception management, and garbage collection.

The system library may include a plurality of functional modules, for example, a surface manager (Surface Manager), a media library (Media Libraries), a three-dimensional graphics processing library (for example, an OpenGL ES), a 2D graphics engine (for example, an SGL), an input module, and the like.

The surface manager is configured to: manage a display subsystem, and provide a fusion of 2D and 3D layers for a plurality of applications. The media library supports playback and recording of a plurality of common audio and video formats, a still image file, and the like. The media library may support a plurality of audio and video coding formats, for example, MPEG4, H.264, MP3, AAC, AMR, JPG, and PNG. The three-dimensional graphics processing library is configured to implement three-dimensional graphics drawing, image rendering and synthesis, layer processing, and the like. The 2D graphics engine is a drawing engine for 2D drawing.

The input module is configured to transfer, to a corresponding application, a touch event generated by a touch operation entered by the user.

The kernel layer is a layer between hardware and software, and is configured to provide a core system service for the Android kernel, such as a security service, a network service, a memory management service, a detection management service, and a driver model. The kernel layer may include a display driver, a camera driver, an audio driver, and a sensor driver.

After the user enters the touch operation, a touch sensor in a hardware device may generate a corresponding hardware interrupt, and send the hardware interrupt to the kernel layer. The kernel layer may encapsulate the touch operation into a touch event (for example, an action down (action down) event, an action move (action move) event, or an action up (action up) event), and may report the touch event to an upper-layer APP by using the input module in the system library.

As described in the foregoing embodiment, after entering the annotation mode, the electronic device 100 may load an annotation layer on an application interface. In this way, a touch event generated by a scrolling operation entered by the user is processed by the annotation layer, and an APP located below the annotation layer cannot receive the touch event, and in this way, interface scrolling cannot be implemented. In this embodiment, interface scrolling in the annotation mode may be implemented in a manner of simulating a touch event. To implement a scrolling annotation function, a content sensor may be added to the application framework layer, and an annotation application may implement a scrolling annotation process by using the content sensor. The following describes a scrolling annotation principle.

Figure 20:
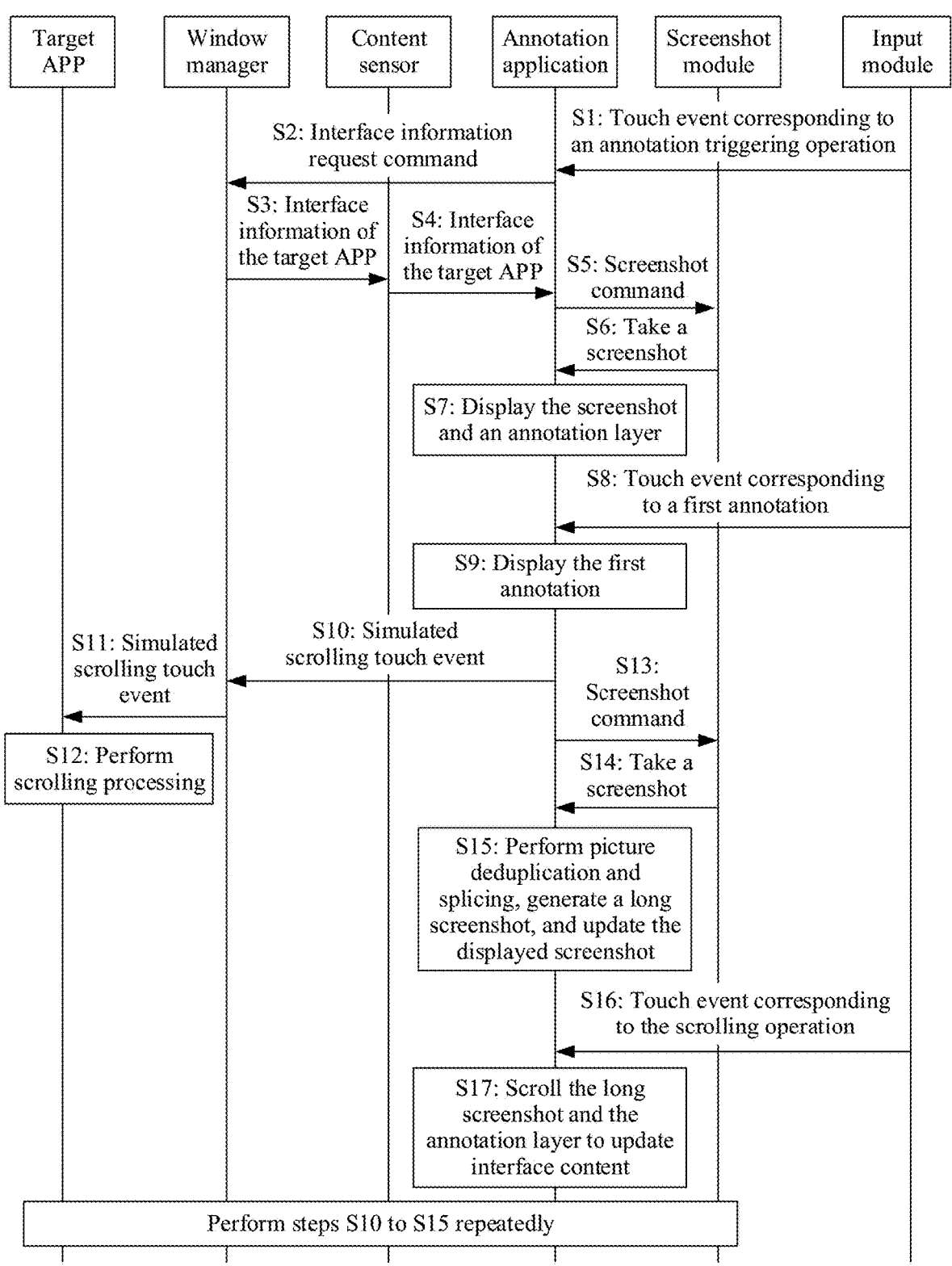
FIG. 20 is a schematic diagram of a scrolling annotation principle according to an embodiment of this application.

FIG. 20 is a schematic diagram of a scrolling annotation principle according to an embodiment of this application. As shown in FIG. 20, after a user enters an annotation triggering operation, an input module may transfer a touch event generated by the annotation triggering operation to an annotation application (step S1). After receiving the touch event, the annotation application may send an interface information request command to a window manager in response to the touch event (step S2), to obtain APP interface information.

After receiving the interface information request command, the window manager may transfer currently displayed interface information of an APP (referred to as a target APP herein) to a content sensor (step S3). Then, the content sensor may transfer the interface information of the target APP to the annotation application (step S4).

The target APP may include one or more APPs. For example, the target APP may include the "Gallery" APP and the "Notepad" APP shown in FIG. 3. A processing process of each target APP is similar, and one target APP is used as an example for description herein.

After obtaining the interface information of the target APP, the annotation application may determine a position of a content display control in an interface of the target APP (referred to as a first target position herein) based on interface layout information in the interface information, and then send a screenshot command to a screenshot module (step S5), to notify the screenshot module to take a screenshot of the first target position.

After completing the screenshot, the screenshot module may return the screenshot to the annotation application (step S6). Then, the annotation application may load an annotation layer on the screenshot for display (step S7).

If the user adds a first annotation on the annotation layer, an input module may transfer a touch event corresponding to the first annotation to the annotation application (step S8); and the annotation application may display, on the annotation layer in response to the touch event, the first annotation added by the user (step S9).

In addition, after obtaining the screenshot returned by the screenshot module, the annotation application may simulate a touch event corresponding to the scrolling operation (a scrolling touch event for short), and then send the simulated scrolling touch event to the window manager (step S10), to notify the window manager to transfer the simulated scrolling touch event to the target APP.

After the window manager transfers the simulated scrolling touch event to the target APP (step S11), the target APP may perform a corresponding scrolling processing process (step S12).

When interface content is scrollable, the target APP may scroll the interface content. When the interface content is non-scrollable, that is, the interface content has reached the bottom, the target APP may not scroll the interface content.

After sending the simulated scrolling touch event to the window manager, the annotation application may determine a position of a scrollable control (referred to as a second target position herein) based on the previously obtained interface information of the target APP, and then send a screenshot command to the screenshot module (step S13), to notify the screenshot module to take a screenshot of the second target position.

Specifically, the annotation application may determine, based on a control type, whether interface content in the control is scrollable. The scrollable control may include RecycleView, ListView, ScrollView, PageView, WebView, and the like. For example, a RecycleView control is usually used on a home page in the "Gallery" APP, a ListView control is usually used in a news APP, a ScrollView control is usually used in the "Contacts" APP, a PageView control is usually used in a slide APP, and a WebView control is usually used in a web page APP.

After determining the scrollable control, the annotation application may determine the position of the scrollable control as the second target position, and indicate the screenshot module to take a screenshot of the position.

After completing the screenshot, the screenshot module may return the screenshot to the annotation application (step S14). Then, the annotation application may perform picture deduplication and picture splicing, and update the displayed screenshot after generating a long screenshot (step S15).

Specifically, the annotation application may compare the screenshot obtained this time with the screenshot obtained last time. If the entire interface content of the screenshot obtained this time already exists in the screenshot obtained last time, it indicates that the interface content of the target APP has been scrolled to the bottom. In this case, interface filling may be performed at the bottom of the interface content of the target APP, for example, a white page is filled. If the screenshot obtained last time does not include the entire interface content in the screenshot obtained this time, newly loaded interface content in the screenshot obtained this time may be spliced to the bottom of the interface content in the screenshot obtained last time, to generate a long screenshot.

If the user enters a scrolling operation on the annotation layer, the input module may transfer a touch event corresponding to the scrolling operation to the annotation application (step S16); and the annotation application may scroll the long screenshot and the annotation layer in response to the touch event, to update the displayed interface content (step S17).

In addition, after the annotation application performs step S15, if it is determined that the interface content of the target APP does not reach the bottom, that is, the interface content of the target APP may continue to be scrolled, the annotation application may return to perform step S10 to update the long screenshot, that is, the electronic device 100 may repeatedly perform steps S10 to S15 until a preset condition is met.

The preset condition may be that the interface content of the target APP reaches the bottom, or the electronic device 100 exits the annotation mode.

When steps S10 to S15 are repeatedly performed, if the preset condition is not met, a next long screenshot update process may be performed after a long screenshot update process is performed each time; or a next long screenshot update process may be performed after preset duration after a long screenshot update process is performed each time. The preset duration between every two long screenshot update processes may be same or may be different. For example, the preset duration may gradually increase.

It may be understood that, when a scrolling annotation function is implemented, the window manager may also be modified, so that the annotation application can directly obtain the APP interface information from the window manager. A manner of adding the content sensor to the application framework layer may reduce changes to an original framework structure and reduce implementation difficulty.

The following describes a structure of the electronic device 100.

Figure 21:
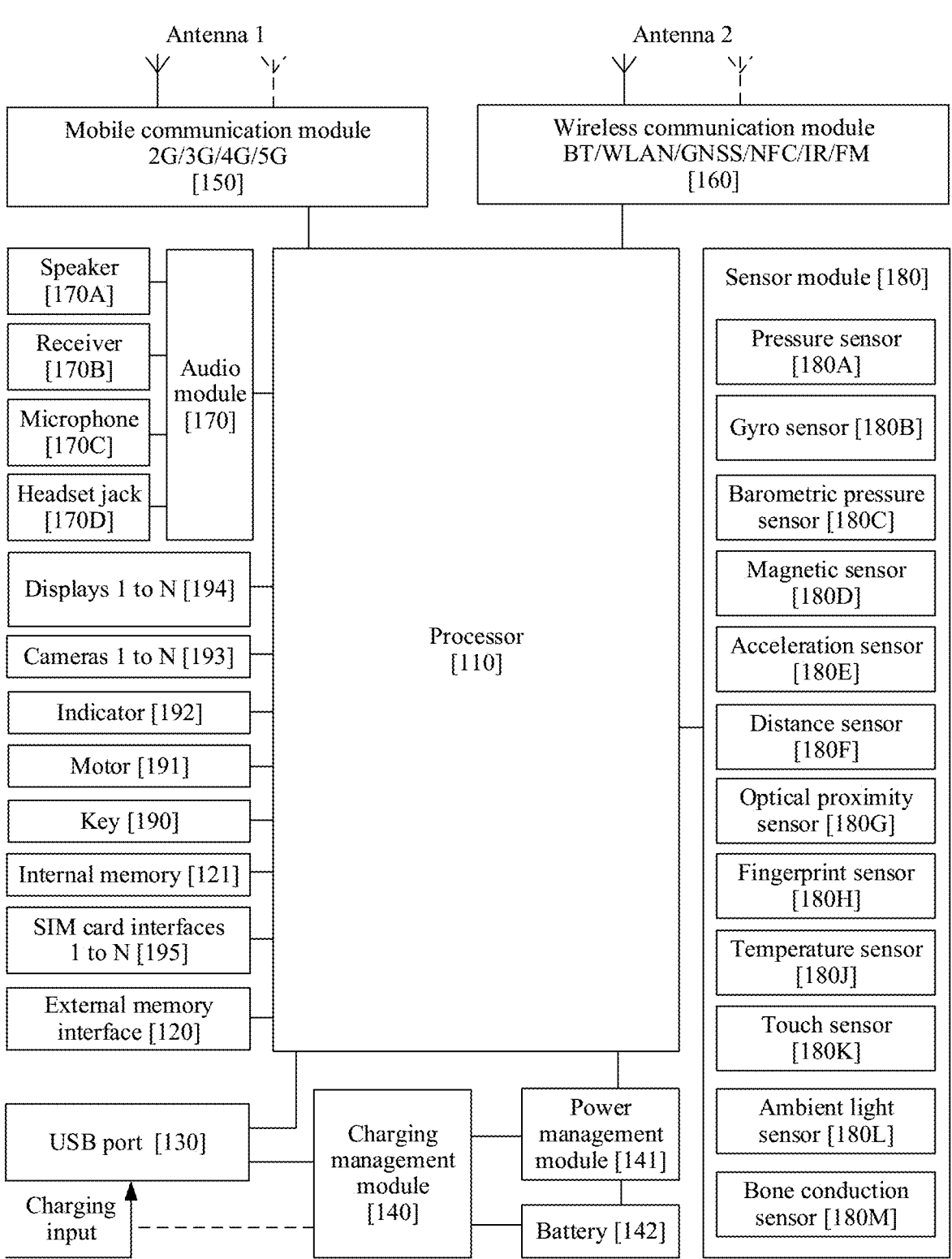
FIG. 21 is a schematic diagram of a structure of an electronic device according to an embodiment of this application.

FIG. 21 is a schematic diagram of a structure of an electronic device according to an embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processor (neural-network processing unit, NPU), and the like. Different processing units may be independent components, or may be integrated into one or more processors.

The controller may be a nerve center and a command center of the electronic device 100. The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache. The memory may store instructions or data that has just been used or cyclically used by the processor 110. If the processor 110 needs to use the instructions or the data again, the processor may directly invoke the instructions or the data from the memory. This avoids repeated access, reduces waiting time of the processor 110, and therefore improves system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). The I2S interface may be used for audio communication. The PCM interface may also be used for audio communication, and analog signal sampling, quantization, and coding. The UART interface is a universal serial data bus, and is used for asynchronous communication. The bus may be a two-way communications bus. The UART interface converts to-be-transmitted data between serial communication and parallel communication. The MIPI interface may be configured to connect the processor 110 to peripheral components such as the display 194 and the camera 193. The MIPI interface includes a camera serial interface (camera serial interface, CSI), a display serial interface (display serial interface, DSI), and the like. The GPIO interface may be configured by using software, and the GPIO interface may be configured as a control signal or a data signal. The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset, to play audio by using the headset. The port may be further configured to connect to another electronic device such as an AR device.

It may be understood that the interface connection relationship between the modules that is shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger by using the USB port 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or charging management module 140, and supplies power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules in the mobile communication module 150 may be disposed in the processor 110. In some embodiments, at least some functional modules of the mobile communication module 150 may be disposed in a same component as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video by using the display 194. In some embodiments, the modem processor may be an independent component. In some other embodiments, the modem processor may be independent of the processor 110, and disposed in a same component as the mobile communication module 150 or another functional module.

The wireless communication module 160 may provide a solution applied to the electronic device 100 for wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini LED, a micro LED, a quantum dot light emitting diode (quantum dot light emitting diodes, QLED), or the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. The camera 193 is configured to capture a static image or a video. The digital signal processor is configured to process a digital signal, and may process another digital signal in addition to the digital image signal. The video codec is configured to: compress or decompress a digital video.

The NPU is a neural-network (neural-network, NN) computing processor. By drawing on a structure of a biological neural network, for example, by drawing on a transmission mode between human brain neurons, the NPU quickly processes input information, and may further continuously perform self-learning. An application such as intelligent cognition, for example, image recognition, facial recognition, speech recognition, or text understanding of the electronic device 100 may be implemented by using the NPU.

The internal memory 121 may be configured to store computer-executable program code. The executable program code includes instructions. The processor 110 executes various function applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data and a phone book) and the like created in a process of using the electronic device 100. In addition, the internal memory 121 may include a high-speed random access memory, and may further include a non-volatile memory, for example, at least one disk storage device, a flash memory device, and a universal flash memory (universal flash storage, UFS).

The external memory interface 120 may be configured to connect to an external memory, for example, a micro SD card, to expand a storage capability of the electronic device 100. The external storage card communicates with the processor 110 by using the external memory interface 120, to implement a data storage function. For example, files such as music and a video are stored in the external storage card.

The electronic device 100 may implement an audio function, for example, video playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110. The speaker 170A, also referred to as a "loudspeaker", is configured to convert an electrical audio signal into a sound signal. The receiver 170B, also referred to as an "earpiece", is configured to convert an electrical audio signal into a sound signal. The microphone 170C, also referred to as a "mike" or a "mic", is configured to convert a sound signal into an electrical signal. The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The key 190 includes a power key, a volume key, and the like. The key 190 may be a mechanical key, or may be a touch key. The electronic device 100 may receive a key input, and generate a key signal input related to user settings and function control of the electronic device 100. The motor 191 may generate a vibration prompt. The motor 191 may be used for an incoming vibration prompt, or may be used for touch vibration feedback. The indicator 192 may be an indicator light, and may indicate a charging status and a battery level change, or may indicate a message, a missed call, a notification, and the like. The SIM card interface 195 is configured to connect to a SIM card. The SIM card may be inserted into the SIM card interface 195 or pulled out of the SIM card interface 195, to implement contact with and separation from the electronic device 100. The electronic device 100 may support one or N SIM card interfaces, where N is a positive integer greater than 1. The SIM card interface 195 may support a nano-SIM card, a micro-SIM card, a SIM card, and the like.

The interaction system provided in this embodiment may execute the foregoing method embodiment, and an implementation principle and a technical effect of the interaction system are similar to those of the method embodiment, and details are not described herein again.

Based on a same concept, as an implementation of the foregoing method, an embodiment of this application provides an annotation apparatus. The apparatus embodiment corresponds to the foregoing method embodiment. For ease of reading, details in the foregoing method embodiment are not described in detail in this apparatus embodiment. However, it should be clarified that the apparatus in this embodiment can correspondingly implement all content in the foregoing method embodiment.

Figure 22:
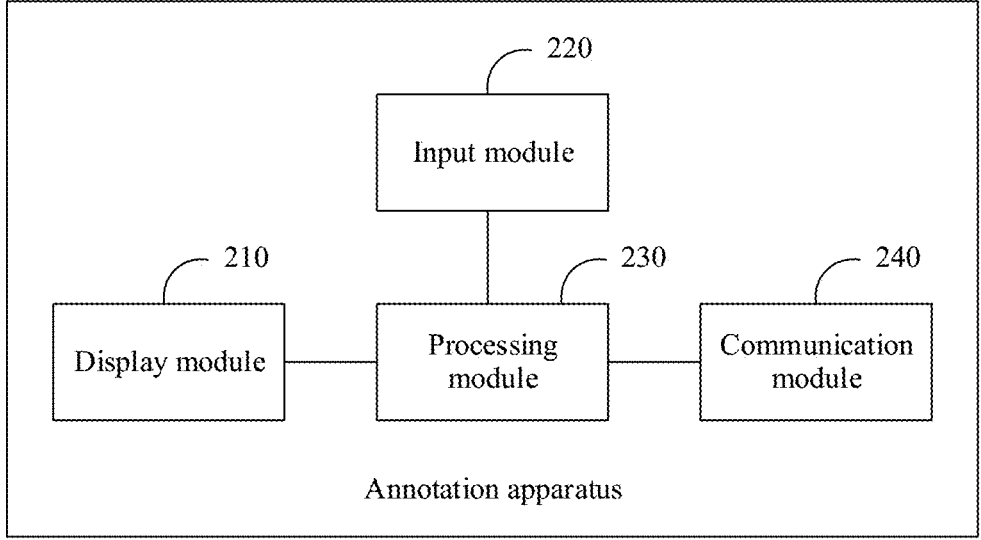
FIG. 22 is a schematic diagram of a structure of an annotation apparatus according to an embodiment of this application.

FIG. 22 is a schematic diagram of a structure of an annotation apparatus according to an embodiment of this application. As shown in FIG. 22, the apparatus provided in this embodiment includes:

a display module 210, an input module 220, a processing module 230, and a communication module 240.

The display module 210 is configured to support an electronic device in performing the interface display operation in the foregoing embodiment and/or another process of the technology described in this specification. The display module may be a touchscreen or another hardware or a combination of hardware and software.

The input module 220 is configured to receive an input of a user on a display interface of the electronic device, for example, a touch input, a voice input, or a gesture input. The input module is configured to support the electronic device in performing steps of a call answering operation of the user in the foregoing embodiment and/or another process of the technology described in this specification. The input module may be a touchscreen or another hardware or a combination of hardware and software.

The processing module 230 is configured to support the electronic device in performing a processing operation related to the annotation process in the foregoing embodiment and/or another process of the technology described in this specification.

The communication module 240 is configured to support the electronic device in performing an operation related to a process of communication with a stylus in the foregoing embodiment and/or another process of the technology described in this specification.

The apparatus provided in this embodiment may execute the foregoing method embodiment, and an implementation principle and a technical effect of the apparatus are similar to those of the method embodiment, and details are not described herein again.

It may be clearly understood by persons skilled in the art that, for the purpose of convenient and brief description, division of the foregoing functional units and modules is only used as an example for illustration. In actual application, the foregoing functions may be allocated to different functional units and modules for completion based on a requirement, that is, an internal structure of an apparatus is divided into different functional units or modules to complete all or some of the functions described above. Functional units and modules in embodiments may be integrated into one processing unit, each of the units may exist alone physically, or two or more units may be integrated into one unit. The integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units and modules in the foregoing system, refer to a corresponding process in the foregoing method embodiment. Details are not described herein again.

An embodiment of this application further provides a computer-readable storage medium. The computer-readable storage medium stores a computer program, and when the computer program is executed by a processor, the method in the foregoing method embodiment is implemented.

An embodiment of this application further provides a computer program product. When the computer program product is run on an electronic device, the electronic device is enabled to perform the method in the foregoing method embodiment.

An embodiment of this application further provides a chip system, including a processor, where the processor is coupled to a memory, and the processor executes a computer program stored in the memory, to implement the method in the foregoing method embodiment. The chip system may be a single chip or a chip module including a plurality of chips.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of this application are entirely or partially generated. The computer may be a general-purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, wireless, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium may include any medium that can store program code, such as a ROM, a random access memory RAM, a magnetic disk, or an optical disc.

Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

In the foregoing embodiments, the descriptions in the embodiments have respective focuses. For a part that is not described in detail in an embodiment, refer to related descriptions in other embodiments.

In embodiments provided in this application, it should be understood that the disclosed apparatus/device and method may be implemented in other manners. For example, the described apparatus/device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

It should be understood that in the descriptions of this specification and the appended claims of this application, the terms "include", "have", and any other variants mean to cover the non-exclusive inclusion, for example, a process, method, system, product, or device that includes a list of steps or modules is not necessarily limited to those steps or modules expressly listed, but may include other steps or modules not expressly listed or inherent to such a process, method, product, or device.

In the descriptions of this application, unless otherwise stated, "/" indicates an "or" relationship between associated objects, for example, A/B may represent A or B. The term "and/or" in this application describes only an association relationship between associated objects, and indicates that three relationships may exist. For example, A and/or B may represent three cases: Only A exists, both A and B exist, and only B exists. A and B may be singular or plural.

In addition, in the descriptions of this application, "a plurality of" means two or more than two. At least one of the following items (pieces) or a similar expression thereof means any combination of these items, including any combination of singular items or plural items. For example, at least one of a, b, and c may represent a, b, c, a-b, a-c, b-c, or a-b-c, where a, b, and c may be singular or plural.

As used in this specification and the appended claims of this application, based on the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of this specification and the appended claims of this application, the terms "first", "second", "third", and the like are intended to distinguish between similar objects but do not necessarily indicate a specific order or sequence. It should be understood that the data termed in such a way are interchangeable in proper circumstances, so that embodiments described herein can be implemented in other orders than the order illustrated or described herein.

Reference to "an embodiment", "some embodiments", or the like described in this specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method, comprising:

displaying a first interface, wherein the first interface comprises a first application interface and a second application interface that are displayed in a split-screen manner, and wherein the first application interface further comprises a first component fixedly displayed at a bottom of the first application interface;

receiving a first annotation operation performed by a user on the first interface;

displaying a first annotation on the first interface in response to the first annotation operation;

receiving a first scrolling operation performed by the user on the first interface;

after receiving the first scrolling operation performed by the user on the first interface, skipping displaying the first component;

displaying a second interface in response to the first scrolling operation, wherein the second interface comprises the first application interface and the second application interface that are displayed in the split-screen manner, and the second interface is different from the first interface;

receiving a second annotation operation performed by the user on the second interface;

displaying a second annotation on the second interface in response to the second annotation operation; and generating a first annotation picture, wherein the first annotation picture comprises the first annotation, the second annotation, the first interface, and the second interface.

2. The method according to claim 1, wherein the displaying the second interface in response to the first scrolling operation comprises:

in response to the first scrolling operation, switching the first application interface displayed in the split-screen manner from a first sub-interface of a first application to a second sub-interface of the first application.

3. The method according to claim 2, further comprising:

in response to the first scrolling operation, switching the second application interface displayed in the split-screen manner from a third sub-interface of a second application to a fourth sub-interface of the second application.

4. The method according to claim 3, wherein in response to the first scrolling operation being an upward scrolling operation, locating the first sub-interface in the first annotation picture above the second sub-interface, and locating the third sub-interface above the fourth sub-interface.

5. The method according to claim 4, wherein in response to the first application interface being located on a left side of the second application interface, locating the first sub-interface in the first annotation picture on a left side of the third sub-interface, and locating the second sub-interface on a left side of the fourth sub-interface; or in response to the first application interface being located on a right side of the second application interface, locating the first sub-interface in the first annotation picture on a right side of the third sub-interface, and locating the second sub-interface on a right side of the fourth sub-interface.

6. The method according to claim 3, wherein the fourth sub-interface is a filling page.

7. The method according to claim 1, further comprising:

displaying a third interface, wherein the third interface comprises a third application interface and a fourth application interface that are displayed in the split-screen manner;

receiving a second scrolling operation performed by the user on the third application interface displayed in the third interface;

in response to the second scrolling operation, displaying the third application interface in full screen;

receiving a third annotation operation performed by the user on the third application interface;

in response to the third annotation operation, displaying a third annotation on the third application interface; and generating a second annotation picture, wherein the second annotation picture comprises the third annotation and the third application interface.

8. The method according to claim 1, further comprising:

displaying a fourth interface, wherein the fourth interface comprises a fifth application interface and a sixth application interface that are displayed in the split-screen manner;

receiving a fourth annotation operation performed by the user on the fifth application interface or the sixth application interface;

in response to the fourth annotation operation, displaying a fourth annotation on the fifth application interface or the sixth application interface;

receiving a third scrolling operation performed by the user on the fifth application interface; and in response to the third scrolling operation, displaying the fifth application interface in full screen.

9. The method according to claim 1, further comprising:

displaying a fifth interface, wherein the fifth interface comprises a seventh application interface and an eighth application interface that are displayed in the split-screen manner;

receiving a fifth annotation operation performed by the user on the fifth interface;

in response to the fifth annotation operation, displaying a fifth annotation, wherein the fifth annotation overlaps a boundary between the seventh application interface and the eighth application interface;

receiving a fourth scrolling operation performed by the user on the fifth interface; and in response to the fourth scrolling operation, displaying a prompt interface for the user to select whether to save the fifth annotation.

10. The method according to claim 1, wherein the method further comprises:

displaying a sixth interface, wherein the sixth interface comprises a ninth application interface displayed in full screen and a tenth application interface displayed in a floating manner on the ninth application interface; and in response to an annotation triggering operation, hiding the tenth application interface displayed in the floating manner, or displaying the ninth application interface and the tenth application interface in the split-screen manner.

11. An electronic device, comprising:

a processor; and a memory with instructions stored thereon, wherein the instructions, when executed by the processor, enable the electronic device to perform:

displaying a first interface, wherein the first interface comprises a first application interface and a second application interface that are displayed in a split-screen manner, and wherein the first application interface further comprises a first component fixedly displayed at a bottom of the first application interface;

receiving a first annotation operation performed by a user on the first interface;

displaying a first annotation on the first interface in response to the first annotation operation;

receiving a first scrolling operation performed by the user on the first interface;

after receiving the first scrolling operation performed by the user on the first interface, skipping displaying the first component;

displaying a second interface in response to the first scrolling operation, wherein the second interface comprises the first application interface and the second application interface that are displayed in the split-screen manner, and the second interface is different from the first interface;

receiving a second annotation operation performed by the user on the second interface;

displaying a second annotation on the second interface in response to the second annotation operation; and generating a first annotation picture, wherein the first annotation picture comprises the first annotation, the second annotation, the first interface, and the second interface.

12. The electronic device according to claim 11, wherein the displaying the second interface in response to the first scrolling operation comprises:

in response to the first scrolling operation, switching the first application interface displayed in the split-screen manner from a first sub-interface of a first application to a second sub-interface of the first application.

13. The electronic device according to claim 12, wherein the instructions, when executed by the processor, further enable the electronic device to perform:

in response to the first scrolling operation, switching the second application interface displayed in the split-screen manner from a third sub-interface of a second application to a fourth sub-interface of the second application.

14. The electronic device according to claim 13, wherein in response to the first scrolling operation being an upward scrolling operation, locating the first sub-interface in the first annotation picture above the second sub-interface, and locating the third sub-interface above the fourth sub-interface.

15. The electronic device according to claim 14, wherein in response to the first application interface being located on a left side of the second application interface, locating the first sub-interface in the first annotation picture on a left side of the third sub-interface, and locating the second sub-interface on a left side of the fourth sub-interface; or in response to the first application interface being located on a right side of the second application interface, locating the first sub-interface in the first annotation picture on a right side of the third sub-interface, and locating the second sub-interface on a right side of the fourth sub-interface.

16. The electronic device according to claim 13, wherein the fourth sub-interface is a filling page.

17. The electronic device according to claim 11, wherein the instructions, when executed by the processor, further enable the electronic device to perform:

displaying a third interface, wherein the third interface comprises a third application interface and a fourth application interface that are displayed in the split-screen manner;

receiving a second scrolling operation performed by the user on the third application interface displayed in the third interface;

in response to the second scrolling operation, displaying the third application interface in full screen;

receiving a third annotation operation performed by the user on the third application interface;

in response to the third annotation operation, displaying a third annotation on the third application interface; and generating a second annotation picture, wherein the second annotation picture comprises the third annotation and the third application interface.

18. The electronic device according to claim 11, wherein the instructions, when executed by the processor, further enable the electronic device to perform:

displaying a fourth interface, wherein the fourth interface comprises a fifth application interface and a sixth application interface that are displayed in the split-screen manner;

receiving a fourth annotation operation performed by the user on the fifth application interface or the sixth application interface;

in response to the fourth annotation operation, displaying a fourth annotation on the fifth application interface or the sixth application interface;

receiving a third scrolling operation performed by the user on the fifth application interface; and in response to the third scrolling operation, displaying the fifth application interface in full screen.

19. A method, comprising:

displaying a first interface, wherein the first interface comprises a first application interface and a second application interface that are displayed in a split-screen manner;

receiving a first annotation operation performed by a user on the first interface;

displaying a first annotation on the first interface in response to the first annotation operation;

receiving a first scrolling operation performed by the user on the first interface;

displaying a second interface in response to the first scrolling operation, wherein the second interface comprises the first application interface and the second application interface that are displayed in the split-screen manner, and the second interface is different from the first interface;

receiving a second annotation operation performed by the user on the second interface;

displaying a second annotation on the second interface in response to the second annotation operation;

generating a first annotation picture, wherein the first annotation picture comprises the first annotation, the second annotation, the first interface, and the second interface;

displaying a third interface, wherein the third interface comprises a third application interface and a fourth application interface that are displayed in the split-screen manner;

receiving a second scrolling operation performed by the user on the third application interface displayed in the third interface;

in response to the second scrolling operation, displaying the third application interface in full screen;

receiving a third annotation operation performed by the user on the third application interface;

in response to the third annotation operation, displaying a third annotation on the third application interface; and generating a second annotation picture, wherein the second annotation picture comprises the third annotation and the third application interface.

20. The method according to claim 19, wherein the displaying the second interface in response to the first scrolling operation comprises:

in response to the first scrolling operation, switching the first application interface displayed in the split-screen manner from a first sub-interface of a first application to a second sub-interface of the first application.

* * * * *